(12) United States Patent
Noworra

(10) Patent No.: US 12,453,621 B2
(45) Date of Patent: Oct. 28, 2025

(54) METHOD FOR PRODUCING A TOOTH REPLACEMENT PART

(71) Applicant: DENTSPLY SIRONA inc., York, PA (US)

(72) Inventor: Oliver Noworra, Leimen (DE)

(73) Assignee: Dentsply Sirona Inc., York, PA (US)

( * ) Notice: Subject to any disclaimer, the term of this patent is extended or adjusted under 35 U.S.C. 154(b) by 925 days.

(21) Appl. No.: 17/439,189

(22) PCT Filed: Mar. 17, 2020

(86) PCT No.: PCT/EP2020/057289
§ 371 (c)(1),
(2) Date: Sep. 14, 2021

(87) PCT Pub. No.: WO2020/187910
PCT Pub. Date: Sep. 24, 2020

(65) Prior Publication Data
US 2022/0151747 A1  May 19, 2022

(30) Foreign Application Priority Data
Mar. 21, 2019 (EP) ..................................... 19164483

(51) Int. Cl.
*A61C 13/00* (2006.01)

(52) U.S. Cl.
CPC ...... *A61C 13/0004* (2013.01); *A61C 13/0022* (2013.01)

(58) Field of Classification Search
CPC ... A61C 13/0004; A61C 13/0022; A61C 5/77; G06F 30/20
See application file for complete search history.

(56) References Cited

U.S. PATENT DOCUMENTS

2010/0126020 A1* 5/2010 Deriaz ................... B21D 53/28
                                                                72/352
2012/0076598 A1* 3/2012 Bender ................. B23F 17/006
                                                                409/55
(Continued)

FOREIGN PATENT DOCUMENTS

DE      102009001428 A1    9/2010
EP          3711707 A1    9/2020
(Continued)

OTHER PUBLICATIONS

International Search Report; PCT/EP2020/057289; Apr. 6, 2020 (completed); Apr. 17, 2020 (mailed).
(Continued)

*Primary Examiner* — Thomas C Lee
*Assistant Examiner* — Tyler Dean Hedrick
(74) *Attorney, Agent, or Firm* — SCHWEGMAN LUNDBERG & WOESSNER, P.A.

(57) ABSTRACT

The invention relates to a method for producing a tooth replacement part from a blank using a CAM processing device. The method includes a step of varying the orientation of a blank body in a processing position relative to two processing tools. The varying includes a first orienting of the blank body and processing tools relative to one another from a first processing orientation into a second processing orientation. In so doing, the orientation of the blank body relative to the two processing tools in the first processing orientation in relation to the orientation of the blank body relative to the two processing tools in the second processing orientation is pivoted at a first pivot angle.

20 Claims, 16 Drawing Sheets

(56) References Cited

U.S. PATENT DOCUMENTS

| | | | |
|---|---|---|---|
| 2012/0087757 A1 | 4/2012 | Basler | |
| 2012/0309271 A1* | 12/2012 | Geiser | B24B 53/00 |
| | | | 451/283 |
| 2013/0144417 A1 | 6/2013 | Pieper | |
| 2014/0189991 A1 | 7/2014 | Duncan et al. | |
| 2016/0346888 A1* | 12/2016 | Huber | B23Q 39/024 |
| 2017/0212495 A1* | 7/2017 | Okita | G05B 19/4063 |
| 2019/0374306 A1* | 12/2019 | Huber | B23Q 3/15526 |

FOREIGN PATENT DOCUMENTS

| | | |
|---|---|---|
| EP | 3711707 B1 | 1/2022 |
| WO | 2014058874 A1 | 4/2014 |
| WO | 2018029244 A1 | 2/2018 |
| WO | WO-2020187910 A1 | 9/2020 |

OTHER PUBLICATIONS

International Preliminary Report on Patentability; PCT/EP2020/057289; Apr. 6, 2020 (completed); Apr. 17, 2020 (mailed).
Written Opinion of the International Searching Authority; PCT/EP2020/057289; Apr. 6, 2020 (completed); Apr. 17, 2020 (mailed).
"European Application Serial No. 19164483.0, Extended European Search Report mailed Aug. 26, 2019", 6 pgs.
"European Application Serial No. 19164483.0, Response filed Mar. 23, 2021 to Extended European Search Report mailed Aug. 26, 2019", 89 pgs.

* cited by examiner

METHOD FOR PRODUCING A TOOTH REPLACEMENT PART

CROSS-REFERENCE TO RELATED APPLICATIONS

This is a National Phase application of International Application No. PCT/EP2020/057289, filed Mar. 17, 2020, which claims the benefit of and priority to European Application Ser. No. 19164483.0, filed on Mar. 21, 2019, which are herein incorporated by reference for all purposes.

TECHNICAL FIELD

This invention relates to a method for producing a tooth replacement part, a CAM processing device, a CAD/CAM processing system, and a computer program for controlling a CAM processing device for producing a tooth replacement part.

BACKGROUND

Tooth replacement parts, such as crowns, bridges or inlays, are usually produced from a blank using an appropriate processing device, for example a single-spindle CAM processing device. A blank of this kind comprises a blank body made of tooth restoration material.

In order to produce the tooth replacement part, the blank body is machined using a rotating pin-shaped material-removing processing tool, which for example is movable in three orthogonal spatial directions. One of these spatial directions usually is the axis of rotation of the processing tool. Tooth replacement parts, on account of the decisive structure of the natural teeth, usually likewise have a complex outer surface structure and, in the case of recesses or lumen, a complex inner surface structure, which surface structures in particular may be curved. In order to be able to machine accordingly curved surfaces, in particular undercuts, from the blank body, it is often necessary for the processing tool to engage with the blank body from different spatial directions. This, however, is associated with the problem that on the one hand a corresponding processing is relatively lengthy and on the other hand there is often a need, due to inaccuracies, for secondary machining of surface transitions by hand. Corresponding inaccuracies when the processing tool is used from different spatial directions are caused for example by tool deflections, which generally result from the cutting performed by the machining processing tool at its outer surface.

DE 10 2009 001 428 A1 discloses a dental machine for manufacturing dental restorations from a dental blank. In the dental machine, two dental tools are arranged on the opposite sides of the dental block and aligned on a common tool axis, and the dental blank is arranged on a feed axis which is tilted through an angle relative to the tool axis.

WO 2018/029244 A1 discloses a blank for producing a tooth replacement part.

WO 2014/058874 A1 discloses a milling machine for milling a dental item from a workpiece. In the milling machine, two dental tools are arranged on the opposite sides of the workpiece and each has 3 degrees of freedom, wherein the workpiece is fixed in space.

SUMMARY

The objective of this invention is to enable improved production of a tooth replacement part from a blank.

This objective is achieved through the method as defined in claim 1. Further developments are defined in the dependent claims.

The present invention provides a method for producing a tooth replacement part from the blank using a CAM processing device. The blank comprises a blank body made of tooth restoration material. The CAM processing device comprises a holding device for positioning the blank in a processing position.

The CAM processing device further comprises a first pin-shaped material-removing processing tool rotatable about a first longitudinal tool axis and a second pin-shaped material-removing processing tool rotatable about a second longitudinal tool axis for machining the tooth replacement part from the blank.

The two longitudinal tool axes are coupled to one another during the machining such that both longitudinal tool axes are oriented parallel to one another.

The two processing tools, in the processing position, at least temporarily simultaneously come into contact with the blank body from opposite sides during the machining and, depending on the shape of the tooth replacement part to be machined, are moved along a first movement axis perpendicular to the two longitudinal tool axes and a second movement axis parallel to the two longitudinal tool axes.

The method comprises a step of varying the orientation of the blank body in the processing position relative to the two processing tools. The varying step comprises a first orienting of the blank body and processing tools relative to one another from a first processing orientation into a second processing orientation. The orientation of the blank body relative to the two processing tools in the first processing orientation is pivoted, in relation to the orientation of the blank body relative to the two processing tools in the second processing orientation, about a pivot axis oriented perpendicularly to the two movement axes.

Here, a "tooth replacement part" is understood to mean a dental prosthesis, such as a crown, a bridge or an inlay, for restorative dentistry.

A "CAM processing device" is understood here to mean in particular a program-controlled machine for machining a blank in order to produce a tooth replacement part. The present processing device is configured such that at least two processing tools are used at the same time. Consequently, in the case of two processing tools the processing device is a two-spindle processing device.

A "processing tool", also referred to as a "material-removing processing tool", is understood to mean in particular a tool for the CAM processing device for machining a blank in order to produce a tooth replacement part.

A processing tool of this kind may be, for example, a milling tool, which has at least one defined cutting edge, which is set in rotation as a result of rotation of the milling tool, for example about a longitudinal axis of the milling tool. A processing tool of this kind may be, for example, a grinding tool, which in contrast to a milling tool does not have a defined cutting edge, but instead undefined cutting edges which are formed by an abrasive processing surface. For example, the processing surface may be covered with abrasive particles, such as diamonds with a specific grain size, whereby the undefined cutting edges are formed. As a result of rotation of the grinding tool, for example about a longitudinal axis of the grinding tool, the undefined cutting edges are set in rotation. In both of the aforementioned embodiments it may be advantageous if the machining is performed using an outer surface of the processing tool rather than the end face, in particular rather than the central region of the end face. The outer surface has the greatest rotational speed in the event of rotation about the longitudinal axis of the processing tool, whereas the rotational speed in the centre of the end face is close to zero.

Embodiments may have the advantage that they make it possible for the blank to be processed by means of two processing tools simultaneously, in particular from opposite sides. The processing time necessary to machine the tooth replacement part from the blank body may thus be significantly reduced compared to a processing using just one processing tool. In the ideal case, the processing time is thus halved. For example, the two processing tools process the blank body from opposite sides, wherein one processing tool for example machines an upper side of the tooth replacement part, whereas the second processing tool machines an underside of the tooth replacement part.

The coupling of the two longitudinal tool axes during the machining makes it possible to use a compact CAM processing device, the mechanical structure of which may be made relatively simple, since for example there is no need for the axes of rotation of the two processing tools to be capable of being pivoted out of the parallel orientation independently of one another.

A correspondingly simplified structure is not only economical, but at the same time reduces the number of possible wear parts and/or malfunctions, whereby the device on the whole is less susceptible to faults and thus requires less maintenance. In particular, service lifes thus may be extended as well.

At the same time, however, embodiments further make it possible to vary the angle of contact of the processing tools at the blank bodies. Here, the placement of the processing tools against the blank body is changed continuously during the processing, for example so as to be able to machine also behind an equator of the tooth replacement part that is to be machined. In this way, a hard transition, for example in the form of irregularities, e.g. discontinuities, in the curvature of the surfaces to be machined, between the regions of the tooth replacement parts processed by the various processing tools may be avoided. The different angles of contact are the result of the varying of the orientation of the blank body relative to the two processing tools. Here, the blank body may in principle be pivotable about a pivot axis relative to the two processing tools and/or the two processing tools may be pivotable simultaneously with their coupled axes of rotation about a pivot axis relative to the blank body. Varying the angle of contact makes it possible for different regions of the tooth replacement part that is to be machined to be reached without varying the spatial direction from which the processing tools come into contact with the blank body. At the same time, by varying the angle of contact it may be ensured that the processing tools always come into contact with and machine the blank material by means of their outer surface, regardless of the geometric shape of the surface of the tooth replacement part that is to be machined. This has the advantage that the service lifes of the processing tools may be significantly extended, since the outer surface has the maximum speed of rotation. By contrast, a central region of the end face of the processing tools, said central region lying on the axis of rotation of the processing tools, has a speed of rotation of zero or close to zero. In the event that these regions come into contact with the tooth restoration material, said regions experience a maximal loading of the corresponding processing tool, which may lead to rapid wear.

In accordance with embodiments the first orienting comprises a pivoting of the orientation of the blank body relative to the two processing tools from the first processing orientation into the second processing orientation simultaneously with a feed movement of at least one of the two processing tools through the tooth restoration material of the blank body during the machining.

Embodiments may have the advantage that, by varying the orientation whilst at least one of the two processing tools is moved through the tooth restoration material, a continuous variation of the angle of contact during the machining is made possible. Also in the case of a varying curvature of the surface region of the tooth replacement part to be processed, the angle of contact may thus be varied in a manner adapted to the variation in curvature. As a result, it may be ensured that an optimal angle of contact is always used. An angle of contact is optimised when it is selected such that a central region of the end face of the processing tool does not come into contact with the tooth restoration material, or such that, should the end face of the processing tool come into contact with the tooth restoration material, said processing tool is not fed perpendicularly to the central region of its end face.

In accordance with embodiments the varying of the orientation of the blank body relative to the two processing tools comprises a pivoting of the blank body about the pivot axis by means of the holding device.

Embodiments may have the advantage that in the case of an implementation of the pivoting by means of the holding device of the blank, holding and drive devices for holding and rotating the processing tools may be structured more simply. In other words, the corresponding holding and drive devices of the processing tools do not have to be rotatable about an additional axis in order to realise the pivoting. In particular, the complexity of the corresponding elements or devices may thus be reduced. The holding device of the blank body is for example configured to pivot the blank independently of movements of the holding and drive devices of the processing tools, without further rotations, for example as with the processing tools, having to be implemented in addition.

In accordance with embodiments the varying of the orientation of the blank body relative to the two processing tools comprises a pivoting of the two processing tools about the pivot axes.

Embodiments may have the advantage that merely the processing tools or the holding and drive devices of the processing tools are configured to perform rotation or pivot movements. Consequently, the number of device elements movable independently of one another may be reduced. In particular, the holding device of the blank body may be structured simply, since it does not have to implement an additional rotation or pivot movement.

In accordance with embodiments the varying of the orientation is at least performed in order to machine a first region of an outer surface of the tooth replacement part by means of the first processing tool, said first region comprising a first overlap region which is to be processed by both processing tools.

Embodiments may have the advantage that, by varying the orientation, processing regions of the tooth replacement part referred to as overlap regions may be made accessible to both processing tools although the surfaces of the tooth replacement part that is to be machined have varying curvatures. Corresponding curvatures may have an undercut, for example. A corresponding undercut is provided if one of the processing tools, for a given angle of contact, when fed in the direction of the surface regions parallel to the axis of rotation of the particular processing tool, as a result of the curvature cannot reach said surface regions by means of a maximal triaxial movement along orthogonal spatial axes. Here, embodiments may have the advantage in particular that the corresponding overlap regions may be processed by the two processing tools from opposite directions, whereby transitions in this region may be made more uniform. Corresponding overlap regions constitute boundary regions between regions which may be processed only by a single one of the two processing tools, i.e. singly. By forming the boundary regions between the regions which may be processed only by a single processing tool as overlap regions, a uniform transition may be provided between the corresponding regions processed singly. In particular, uniform curvatures thus may be machined in this region, whereby the need or the outlay for secondary machining may be minimised or avoided entirely.

In accordance with embodiments the varying of the orientation further comprises a second orienting of the blank body and processing tools relative to one another in a third processing orientation. The orientation of the blank body relative to the two processing tools in the third processing orientation is pivoted about the pivot axis through a second pivot angle in relation to the orientation of the blank body relative to the two processing tools in the second processing orientation, in a pivot direction inverse to the first pivot angle. The second orienting is provided at least for the secondary machining of the first overlap region, machined by the first processing tool, by means of the second processing tool.

Embodiments may have the advantage that, by means of a second varying of the orientation, it may be ensured that processing by both processing tools is possible in the region of the overlap regions, in particular the first overlap region. In particular, it may be ensured that both processing tools may come into contact with the tooth restoration material at the same and/or a comparable angle of contact. The same curvature may thus be processed by both processing tools with opposite feed movements at identical angles of contact.

In accordance with embodiments the second orienting comprises a pivoting of the orientation of the blank body relative to the two processing tools from the second processing orientation into the third processing orientation simultaneously with the feed movement of at least one of the two processing tools through the tooth restoration material of the blank body during the machining.

Embodiments may have the advantage that the angle of contact of the second tool may be varied as said tool comes into contact with the blank body, at the same time as this is being machined by the particular processing tool. The angle of contact may thus be varied during the machining and adapted optimally to a curvature, in particular a varying curvature, of the surface of the tooth replacement part that is to be machined in the region of the overlap region.

In accordance with embodiments the equator of the tooth replacement part runs through the first overlap region and, in the second processing orientation of the blank body, defines a maximum extent of the tooth replacement part perpendicularly to the two tool axes. The first overlap region, as a result of the processing by both processing tools, has a continuous curvature at least along a direction perpendicular to the equator.

Embodiments may have the advantage that a continuous curvature may be machined in the region of the equator. An equator of this kind for example constitutes an undercut in an outer surface of the tooth replacement part. Since a tangent to the equator does not intersect any surfaces directly above or below the equator perpendicularly to the circumferential direction of said equator around the tooth replacement part, a processing tool with an axis of rotation coincident with the tangent or extending parallel thereto in the event of a triaxial movement may also come into contact with a surface on one side of the equator at the very most. The equator is generally embodied as a line and extends around the tooth replacement part. In accordance with embodiments the equator may coincide with a preparation line of the tooth replacement part. In accordance with alternative embodiments the equator does not have any points of intersection with the preparation line of the tooth replacement part. In accordance with embodiments the diameter of the closed equator at least in some sections is greater than the diameter of the closed preparation line.

In accordance with embodiments, simultaneously with the machining of the first region of the tooth replacement part comprising the first overlap region, a second region of the outer surface of the tooth replacement part is machined by the second processing tool and comprises a second overlap region. The second overlap region may be processed by both processing tools. The equator of the tooth replacement part runs through the second overlap region, and the two regions are arranged on mutually opposed sides of the tooth replacement part.

Embodiments may have the advantage that the two processing tools process the blank body along parallel processing paths, wherein the start and end regions of the corresponding processing paths are each formed by overlap regions, for example in the region of the equator of the tooth replacement part. It may thus be ensured that processing is performed by both processing tools in the start and end regions of their respective processing paths, since the processing paths of the two processing tools overlap in this region. Transitions between the start regions of one processing tool and the end regions of the other processing tool may thus be made uniform, i.e. with continuous curvatures. For example, the need to perform secondary machining in these regions may thus be reduced and/or avoided entirely.

The varying of the orientation is performed at least in order to machine an undercut in a surface of the tooth replacement part.

In accordance with embodiments the surface in which the undercut is machined is an inner surface in a recess in the tooth replacement part. If the blank body and the two processing tools are oriented relative to one another in the second processing orientation, the undercut to be machined comprises a region of the recess, the extent of which perpendicularly to the first movement axis increases as considered in a direction along the first movement axis into the recess.

Embodiments may have the advantage that undercuts may be machined not only in the region of outer surfaces of the tooth replacement part, for example in the form of equator lines, but also in inner surfaces in recesses or lumens. The principle here is the same as in the case of the outer surfaces. By varying the relative orientation of the blank body and processing tools, the angle of contact at least of the processing tool machining the corresponding recess may be varied. Undercuts may thus also be machined in inner surfaces of the corresponding recess that are to be machined. In particular, the angle of contact may be optimised, i.e. it may be ensured that the end face of the processing tool does not come into contact with the tooth restoration material, or corresponding contact may be minimised.

Embodiments may further have the advantage, regardless of undercuts, that by varying the angle of contact in the event that a steep and/or even vertical surface region is machined in a recess of the tooth replacement part, it is possible to ensure that the end face of the processing tool is prevented from coming into contact with the tooth restoration material and/or that the risk of this occurring is minimised. Stresses on the processing tools may hereby be reduced, and service lifes increased.

In accordance with embodiments the two processing tools are each moved through the tooth restoration material along the two processing axes successively over a plurality of processing paths in parallel movement planes perpendicularly to the two tool axes. The varying of the orientation of the blank body relative to the two processing tools is performed individually for each of the plurality of processing paths.

Embodiments may have the advantage that the tooth replacement part may be machined effectively and efficiently from the blank body in sections, wherein it may be ensured that when machining problematic areas, such as steep outer surfaces, inner surfaces and/or undercuts, the angle of contact may be optimised in such a way that contact between end faces of the processing tools and the tooth restoration material may be minimised or even prevented.

In accordance with embodiments the individual processing paths are each divided into path sections. The plurality of processing paths each comprise at least one first path section, wherein, as said path section is passed through, the orientation of the blank body relative to the two processing tools is pivoted from the first processing orientation into the second processing orientation. The processing paths further each comprise at least one second path section, wherein, as said second path section is passed through, the blank body and the two processing tools are oriented relative to one another in the second processing orientation.

Embodiments may have the advantage that the angle of contact within the first path section is varied, whereas the angle of contact as the second path section is passed through is kept constant. The varying of the angle of contact may thus be limited to a necessary extent, whereby the movement sequences may be simplified and thus made less susceptible to faults.

In accordance with embodiments the plurality of processing paths each comprise a third path section, wherein, as said third path section is passed through, the orientation of the blank body relative to the two processing tools is pivoted from the second processing orientation into the third processing orientation.

Embodiments may have the advantage that the angle of contact may be varied, both in the start region and in the end region of the processing, through the first and second path section, which correspond respectively to the start region of the processing of the tooth replacement part by the processing tools and the end region of the corresponding processing. In particular, the angle of contact thus may be varied in the transition regions between the processing by the first processing tool and processing by the second processing tool. These transition regions may be implemented in particular as overlap regions, which are processed by both processing tools.

In accordance with embodiments the processing paths for at least one of the two processing tools each comprise a fourth and fifth path section. When the fourth path section is passed through, the orientation of the blank body relative to the two processing tools is pivoted from the second processing orientation into a fourth processing orientation, and from the fourth processing orientation back into the second processing orientation. When the fifth path section is passed through, the orientation of the blank body relative to the two processing tools is pivoted from the second processing orientation into a fifth processing orientation, and from the fifth processing orientation back into the second processing orientation.

The orientation of the blank body relative to the two processing tools in the fourth processing orientation is pivoted about the pivot axis through a third pivot angle in relation to the orientation of the blank body relative to the two processing tools and the second processing orientation.

The orientation of the blank body relative to the two processing tools in the fifth processing orientation is pivoted about the pivot axis through a fourth pivot angle in relation to the orientation of the blank body relative to the two processing tools in the second processing orientation, in a pivot direction inverse to the third pivot angle.

The first and second overlap region of the outer surface of the tooth replacement part are processed within the first and third path section. Undercuts are processed in the recess of the tooth replacement part within the fourth and fifth path section. Embodiments may have the advantage that in a fourth and fifth processing step undercuts by way of example may be machined on opposite inner surfaces of a recess of the tooth replacement part by varying the relative orientation of the blank body and processing tools, i.e. by varying the angle of contact of the processing tools. In accordance with embodiments processing paths may further comprise only a corresponding fourth path section, without a corresponding fifth path section.

In accordance with embodiments the two processing tools are moved in a mirror-inverted manner along the first movement axis, at least temporarily. Embodiments may have the advantage that mirror inverted processing of the blank body may be implemented, whereby the processing speed may be significantly increased and the resultant processing time accordingly reduced as compared to processing of the blank body by just a single processing tool.

In accordance with embodiments the method further comprises a relative movement between the two processing tools and the blank body along a third movement axis parallel to the pivot axis. Embodiments may have the advantage that a triaxial movement of the processing tools along orthogonal spatial axes may be implemented solely by movement of the processing tools, without the need to move the blank body additionally.

In accordance with embodiments the two processing tools are each moved along the third movement axis. In accordance with embodiments the holding device for positioning the blank is configured to move the blank body along the third movement axis.

Embodiments may have the advantage that the movement along the third axis may be implemented by movement of the blank. In other words, a biaxial movement may be implemented for example by movements of the processing tools, and a relative movement along a third axis may be implemented by movement of the blank body, thus resulting in a triaxial movement.

In accordance with embodiments the first processing tool machines an upper side and the second processing tool machines an underside of the tooth replacement part.

Embodiments may have the advantage that the processing tools each come into contact with the blank body from opposite directions with parallel orientation. It may thus be ensured that the processing tools may assume identical angles of contact by varying the relative orientation in accordance with the previously explained embodiments.

In accordance with embodiments the two processing tools each have an end face, with said end faces being oriented in opposite directions during the machining.

Embodiments further comprise a CAM processing device for producing a tooth replacement part from a blank. The blank comprises a blank body formed from tooth restoration material. The CAM processing device comprises a holding device for positioning the blank in a processing position.

The CAM processing device further comprises a first pin-shaped material-removing processing tool, which is rotatable about a first longitudinal tool axis, and a second pin-shaped material-removing processing tool, which is rotatable about a second longitudinal tool axis, for machining a tooth replacement part from the blank. The two longitudinal tool axes are coupled to one another during the machining such that both longitudinal tool axes are oriented parallel to one another.

The CAM processing device further comprises a controller for controlling the machining of the blank by means of the two processing tools. The controller is configured to control the processing such that the two processing tools, in the processing position, come into contact with the blank body from opposite sides at least temporarily simultaneously during the machining. Depending on the shape of the tooth replacement part to be machined, the two processing tools are further moved along a first movement axis perpendicular to the two longitudinal tool axes, and along a second movement axis parallel to the two longitudinal tool axes.

The controller is further configured to vary the orientation of the blank body in the processing position relative to the two processing tools. The varying comprises a first orienting of the blank body and processing tools relative to one another from a first processing orientation into a second processing orientation. The orientation of the blank body relative to the two processing tools in the first processing orientation in relation to the orientation of the blank body relative to the two processing tools in the second processing orientation is pivoted at a first pivot angle about a pivot axis, which is oriented perpendicularly to the two movement axes.

In accordance with embodiments the CAM processing device is configured to carry out one or more of the aforementioned embodiments of the method for producing a tooth replacement part.

Embodiments further comprise a CAD/CAM processing system comprising a CAM processing device according to any one of the previously described embodiments and a CAD device for producing a CAD file. The CAD file specifies a CAD model of a tooth replacement part to be produced, said tooth replacement part having at least one undercut in an inner surface of the recess of the tooth replacement part. When the blank body and the two processing tools are oriented relative to one another in the second processing orientation, the undercut comprises a region of the recess of which the extent perpendicularly to the first movement axis increases as considered in a direction into the recess along the first movement axis.

Embodiments may have the advantage that CAD models of the tooth replacement part to be produced which define undercuts in inner surfaces of recesses of the tooth replacement part may be used for the processing of the blank body. Without varying the relative orientation of blank bodies and processing tools in accordance with the previously explained embodiments, corresponding undercuts cannot be machined. Consequently, undercuts would have to be formed therein subsequently, for example by hand. In this case, conventional CAD models would define the recesses without the undercuts, such that said undercuts may only be formed in a secondary machining step. Embodiments may have the advantage that they may be fully automated and additionally enable quicker processing in few processing steps, since the undercuts may be machined during the course of the machine processing.

Embodiments further comprise a computer program for controlling a CAM processing device for producing a tooth replacement part from a blank. The blank comprises a blank body formed from tooth restoration material. The CAM processing device comprises a holding device for positioning the blank in a processing position.

The CAM processing device further comprises a first pin-shaped material-removing processing tool, which is rotatable about a first longitudinal tool axis, and a second pin-shaped material-removing processing tool, which is rotatable about a second longitudinal tool axis, for machining the tooth replacement part from the blank. The two longitudinal tool axes are coupled to one another during the machining such that both longitudinal tool axes are oriented parallel to one another.

The computer program comprises machine-readable program instructions for controlling the machining of the blank by the CAM processing device by means of the two processing tools. The program instructions control the processing such that the two processing tools, in the processing position, come into contact with the blank body from opposite sides at least temporarily simultaneously during the machining. Depending on the shape of the tooth replacement part to be machined, the two processing tools are moved along a first movement axis perpendicular to the two longitudinal tool axes and along a second movement axis parallel to the two longitudinal tool axes.

The machine-readable program instructions further control the varying of the orientation of the blank body in the processing position relative to the two processing tools. The varying comprises a first orienting of the blank body and processing tools relative to one another from a first processing orientation into a second processing orientation. The orientation of the blank body relative to the two processing tools in the first processing orientation in relation to the orientation of the blank body relative to the two processing tools in the second processing orientation is pivoted at a first pivot angle about a pivot axis, which is oriented perpendicularly to the two movement axes.

In accordance with embodiments the computer program product is configured to carry out one or more of the aforementioned embodiments of the method for producing a tooth replacement part.

BRIEF DESCRIPTION OF THE DRAWINGS

Embodiments of the invention will be explained hereinafter in greater detail with reference to the drawings, in which.

DETAILED DESCRIPTION

Elements of the following embodiments which correspond to one another will be denoted by the same reference signs.

Figure 1:
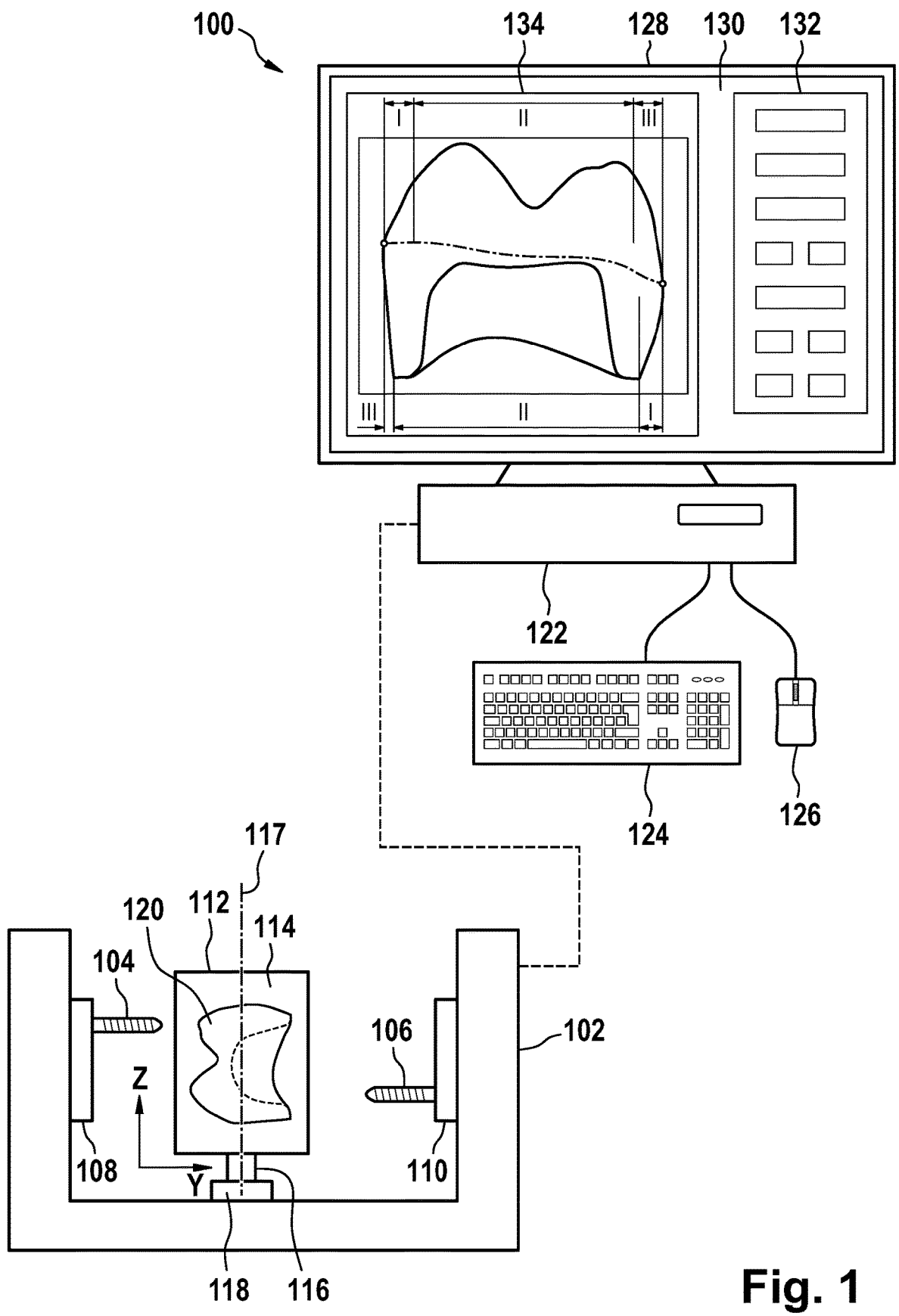
FIG. 1 shows a schematic block diagram of a processing system for producing a tooth replacement part.

FIG. 1 shows a schematic block diagram of a processing system 100 for producing a tooth replacement part 120. In order to produce the tooth replacement part 120, a CAM processing device 102 is used, which is controlled by a computer 122. The computer 122 for example comprises one or more processors and one or more memories, in which machine-readable program instructions for controlling the CAM processing device 102 are stored. Furthermore, the computer 122 may be configured as a CAD device and may comprise machine-readable program instructions for creating CAD models 134. One or more corresponding CAD models 134 are stored in the memory of the computer 122 and define one or more tooth replacement parts that are to be produced, in the form of 3D models. These CAD models 134 are either created by means of the computer 122, itself configured as a CAD device, or by one or more external CAD devices (not shown). In the latter case the CAD models 134 will have been provided to the computer 122 for storage from the external CAD devices for example via a network or by means of an exchangeable data carrier. The corresponding 3D models for example may comprise a three-dimensionally spanned triangle mesh defining the surfaces of the tooth replacement part, i.e. outer surfaces and as applicable inner surfaces. The corresponding CAD model may be provided for example in a generic data format for the exchange of 3D CAD models between various CAD/CAM systems. A generic data format of this kind, such as the STL format, for example contains merely a triangle mesh of the surfaces and of the corresponding 3D model without further additional information. Execution of the machine-readable program instructions by a processor of the computer 122 prompts the computer 122 for example to actuate the CAM processing device 102 such that it machines the tooth replacement part 120 from the blank body 114. To this end, control paths for the processing tools 104, 106 are optimised by the computer 122 in order to machine the tooth replacement part 120 from a blank 112 as precisely and quickly as possible and in a manner that is as gentle as possible for the processing tools 104, 106. In addition, pivot angles over the corresponding paths are defined in order to vary the angle of contact of the processing tools 104, 106 with the blank body 114. In particular, high laterally acting forces and forces acting on the end face of the processing tools 104, 106 may lead to breakage or damage of the processing tools 104, 106, for example milling tools or grinding tools. The control paths of the CAM processing device may describe an arbitrary movement of the processing tools 104, 106 along three orthogonal spatial axes X, Y and Z, wherein the processing tools 104, 106 are moved layer-by-layer along the control path and in so doing machine the tooth replacement part 120 from the blank body 114. The angle of contact of the processing tools 104, 106 may additionally be adapted over these paths to the particular geometry of the tooth replacement part 120 to be machined and/or may be optimised therefor.

The computer system 122 further comprises, for example, a display device 128 such as a monitor 128, and input devices, for example a keyboard 124 and a mouse 126. For example, the CAD model 134 to be processed for the tooth replacement part 120 to be produced is visualised on the monitor 128. The input devices 124, 126 allow the user to select, to create and/or to alter a corresponding CAD model 134. For this purpose, a graphical user interface 130 for example is provided on the monitor 128 and comprises corresponding operating elements 132. For example, the processing of the blank 112 by the CAM processing device 102 may further be started via the operating elements 132 using of the input devices 124, 126.

The CAM processing device 102 comprises two pin-shaped processing tools 104, 106, which for example are arranged on opposite sides of the CAM processing device 102. The longitudinal axes of the processing tools 104, 106 or the axes of rotation of the corresponding processing tools 104, 106 are oriented parallel to one another. In the shown arrangement the longitudinal axes/axes of rotation extend parallel to the spatial axis Z. The processing tools 104, 106 are each held by a holding device 108, 110, said holding devices being configured to move the processing tools 104, 106 for example along three spatial axes. These three spatial axes are the axes X, Y and Z arranged orthogonally to one another. The two axes Y and Z, as shown in FIG. 1, lie within the drawing plane, whereas the axis X extends perpendicularly to the drawing plane. The blank 112 is produced in the form of a blank body 114 from a tooth restoration material. The blank 112 for example further comprises a holder 116, by means of which the blank body 114 is held and positioned in the CAM processing device 102 by means of a holding device 118.

On account of the limited kinematics, there is a coupling between the two processing sides of the tooth replacement part, which coupling is processed by one of the two processing tools 104, 106. The axes of rotation of the two processing tools 104, 106 are coupled parallel to the Z axis. In order to nevertheless be able to vary the angle of contact of the two processing tools 104, 106, the orientation of the two processing tools 104, 106 relative to the blank body 114 is pivoted about a pivot axis 117. If both processing tools 104, 106 are in contact with the blank body 114, the angle of contact of both processing tools 104, 106 is thus varied identically. If only one of the two processing tools 104, 106 is in contact with the blank body 114, only the angle of contact of this one processing tool 104, 106 is thus varied effectively. For example, a synchronisation of both movement sides may be implemented at the start and end of the individual processing paths or control paths, as well as a simultaneous movement of the axes of rotation in these regions, for example with the objective of processing beyond an equator of the tooth replacement part 120 to be produced.

In accordance with embodiments the holding device 118 may be configured to pivot the blank body about the pivot axis 117, which runs parallel to the spatial axis Y. Alternatively, the holding devices 108, 110 of the processing tools 104, 106 may be configured to pivot the processing tools 104, 106 about the pivot axis 117 whilst maintaining the parallel orientation of the axis of rotation. By corresponding pivoting, the orientation of the blank body 114 and thus of the tooth replacement part 120 to be machined therefrom relative to the two processing tools 104, 106 may be varied. In particular, the angle of contact of the processing tools 104, 106 with the blank body 114 may be varied.

Figure 2A:
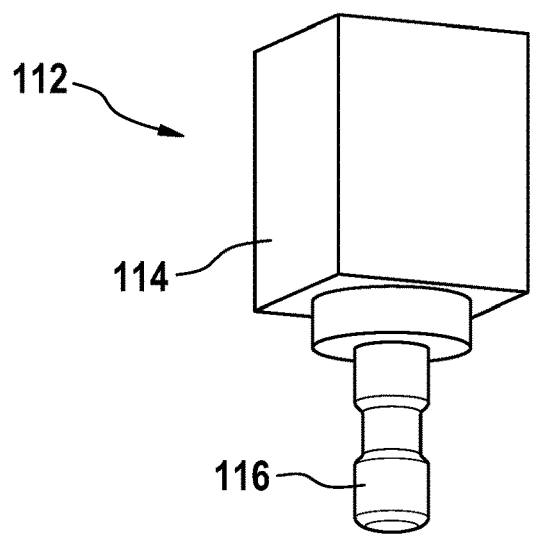
FIG. 2 show exemplary blanks for producing a tooth replacement part.

FIG. 2 shows exemplary blanks 112 for producing the tooth replacement part 120. Corresponding blanks, as shown for example in FIG. 2A, may consist of a cuboid or cube-shaped blank body 114 which is arranged on a pin-shaped holder 116. With the corresponding pin-shaped holder 116, the blank 112 may be fixed in a holding device 118, intended therefor, of the CAM processing device 102. The blank body 114 may have dimensions corresponding to the conventional blanks for known CAM processing devices. The tooth replacement part to be produced for example may be a full prosthesis for an implant, a dental prosthesis, a full crown, a partial crown, a bridge formed of a number of whole teeth, or an inlay. Exemplary dimensions of the blank body 114 comprise 20 mm×19 mm×15.5 mm, 40 mm×19 mm×15.5 mm or 40 mm×19 mm×15.5 mm.

Figure 2B:
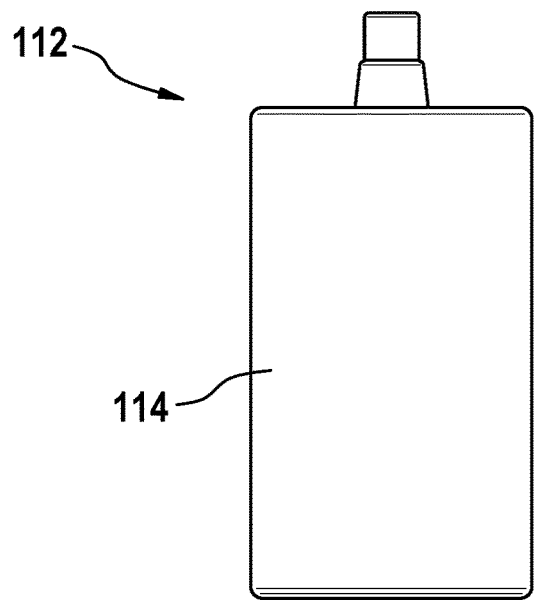
Figure 2C:
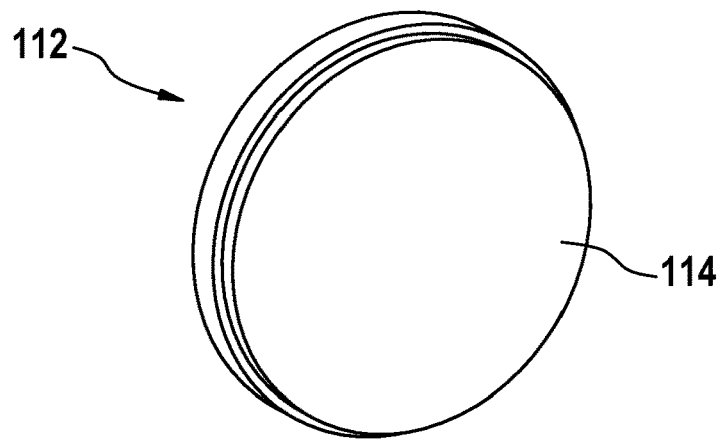

FIG. 2B shows an alternative embodiment of a blank 112 as a preform which consists substantially of a cylindrical blank body 114. The corresponding blank body 114 may be fixed for example directly in an axis of the CAM processing device 102. FIG. 2C lastly shows an exemplary body 114 of a blank 112 which is in the form of a round blank or a disc-shaped blank. A round blank of this kind for example may have a cylindrical, in particular a circular cylindrical, puck-shaped or jaw-shaped contour. Round blanks are commercially available for example in a standard format of 98.5 mm diameter in various ceramic materials. However, a round blank may further have a different diameter, for example 105 mm. Heights of the round blanks may be 13 mm, 16 mm or 22 mm, for example. A round blank may further have a non-circular shape, for example a contour based on the shape of the human jaw. A corresponding round blank is clamped in a clamping device 144 configured for this purpose and may thus be held by a holding device 118 of a CAM processing device 102. A blank 112 in the form of a round blank of this kind according to FIG. 2C may have the advantage that a plurality of tooth replacement parts 120 may be machined from the corresponding blank 112. In the case of the blank 112 according to FIGS. 2A and 2B, a similar effect may be attained in that for example a plurality of blank bodies 114 are clamped in a clamping adapter 146 intended for this purpose and are held by the holding device 118 of the CAM processing device 102 using of the clamping device 144.

The tooth replacement material from which the blank bodies 114 of FIGS. 2A to 2C are made may be, for example, a sintered material, such as a zirconium oxide sintered ceramic or a sintered metal, for example based on a CoCr alloy. Alternatively, the tooth replacement material may be a final-strength material, for example a final-strength dental ceramic. This final-strength material may contain feldspar, may be similar to feldspar, or may be glass-ceramic. In particular, it may consist of lithium-disilicate glass ceramic, crystal ceramic, in particular aluminium oxide and/or zirconium oxide. If the tooth replacement material is a sintered material, a future shrinkage of the dimensions as a result of the necessary end-sintering process in order to achieve the final strength of the corresponding tooth replacement part 120 must be taken into consideration when producing the CAD file 134 specifying the dimensions of the tooth replacement part 120 to be produced. If, however, the tooth replacement material is a final-strength material, no shrinkage has to be taken into consideration when producing the CAD file 134, and instead the CAD file may specify directly the desired end dimensions of the tooth replacement part 120 to be produced.

Figure 3A:
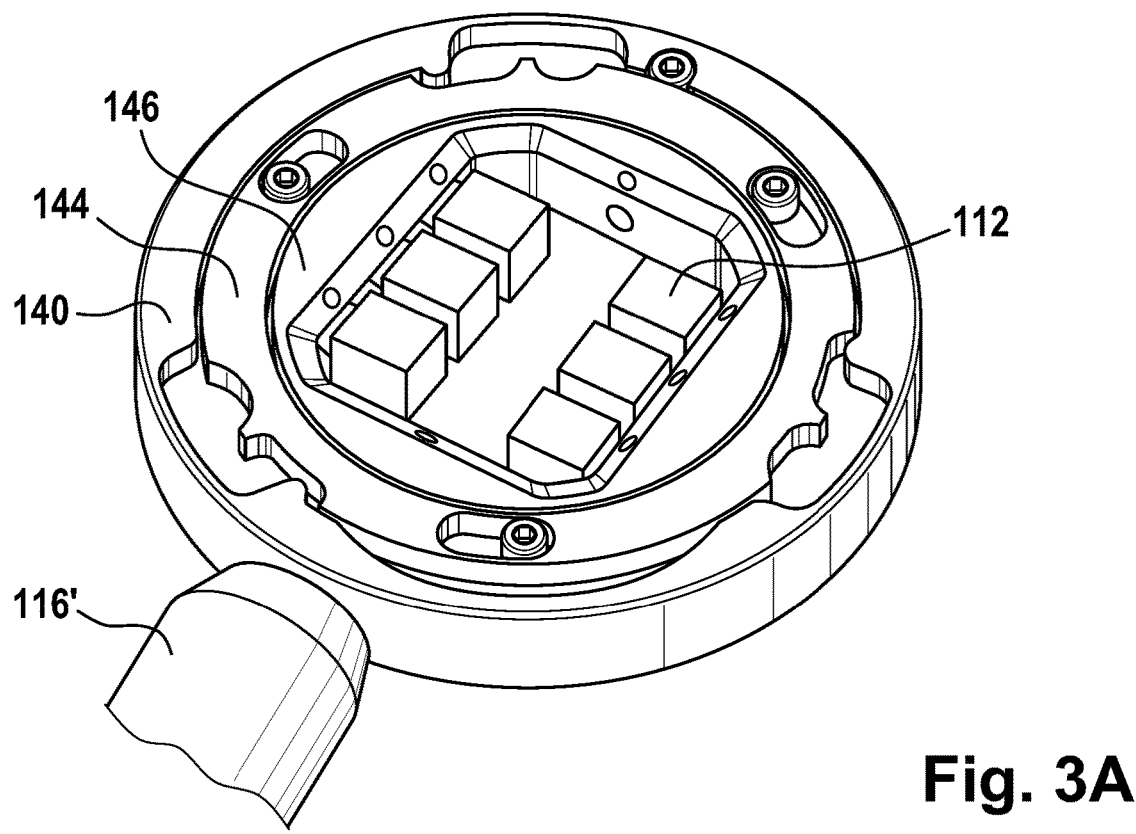
FIG. 3 show exemplary holding adapters for holding blanks.
Figure 3B:
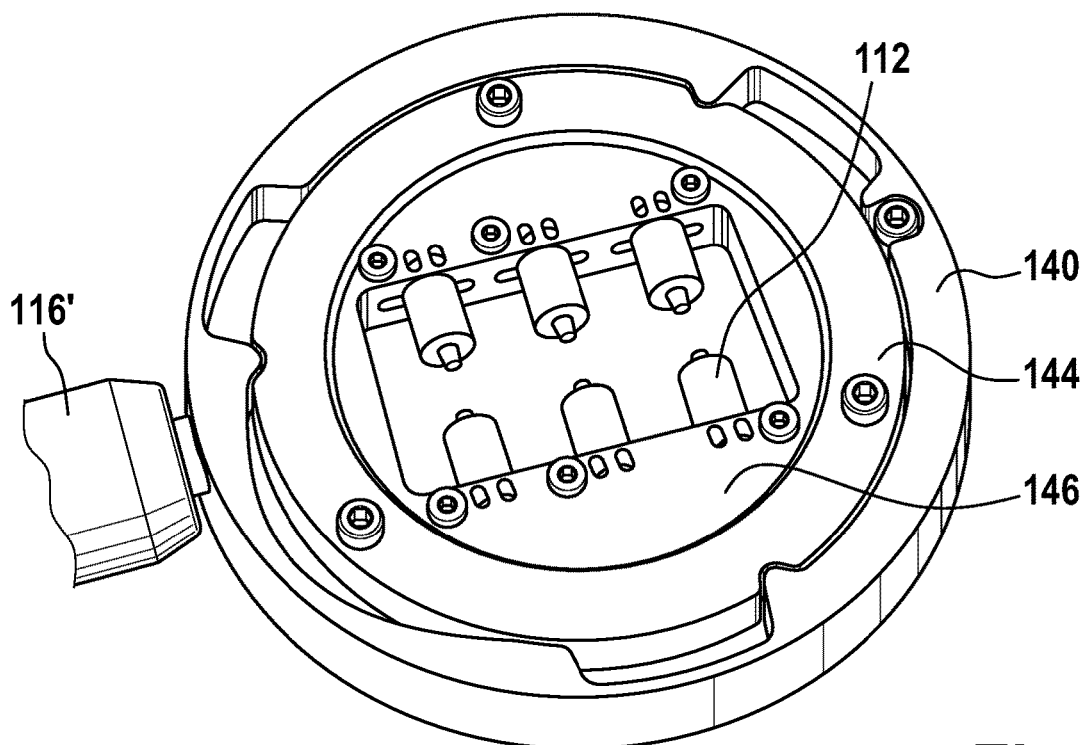
Figure 3C:
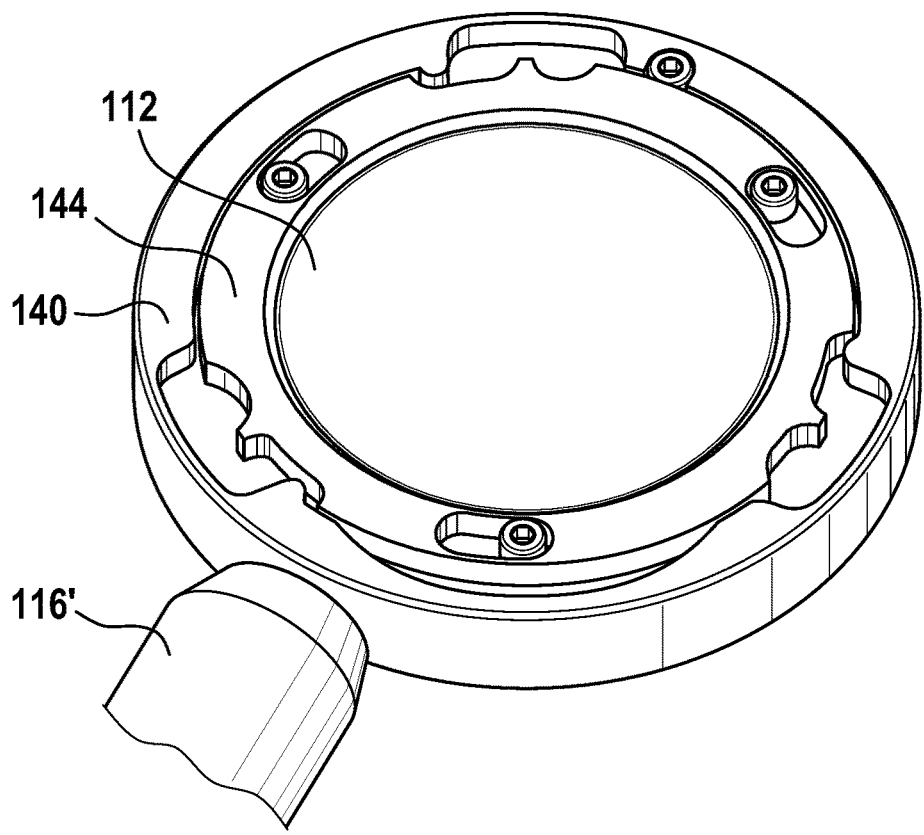

FIG. 3A shows an exemplary embodiment of a corresponding clamping device 144 which is configured to hold a plurality of cuboid blank bodies 114 according to FIG. 2A in a CAM processing device 102. To this end, the holders 116 of the corresponding blanks 112 are for example fixed in a clamping adapter 146 configured for this purpose. For example, a corresponding clamping adapter 146 comprises a plurality of consecutively numbered holding positions, at which the corresponding blanks 112 may be securely clamped by means of a suitable clamping element, for example a screw. The clamping adapter 146 is clamped in the clamping device 144, which is held by a holding adapter 140. The holding adapter 140 comprises a bar-shaped holder 116', by means of which the plurality of blanks 112 according to FIG. 2A may be held in a CAM processing device 102. FIG. 3B shows an embodiment of a holding adapter 140 equivalent to FIG. 3A, wherein the clamping adapter 146 is configured to hold a plurality of blanks 112 according to FIG. 2B in a clamped manner at the positions intended therefor. FIG. 3C shows an alternative embodiment comprising merely the holding adapter 140 and the clamping device 144 according to the preceding FIGS. 3A and 3B. The clamping device 144 is configured to directly clamp the blank 112 in the form of a round blank according to FIG. 2C.

Figure 3D:
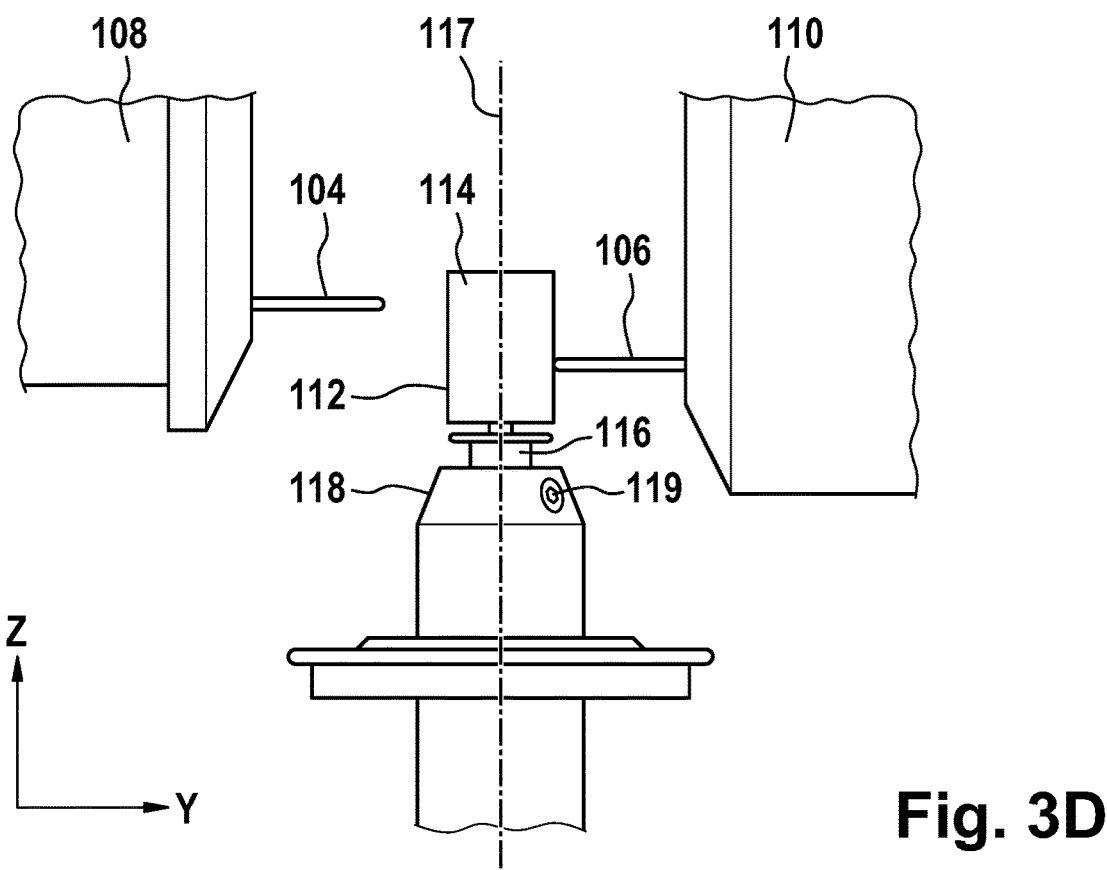

FIG. 3D lastly shows an alternative embodiment in which a blank 112 in the form of a simple block or cuboid blank body 114 is clamped in a holding device. The blank 112 is held by means of the holding device 118, wherein a holder 116 connected to the blank body 114 is clamped in the holding device 118, for example by means of a screw 119. The clamped blank 112 is pivotable about a pivot axis 117 parallel to the spatial axis Y whilst the blank is being processed by means of the two processing tools 104, 106 oriented parallel to one another in the spatial direction Z. The two processing tools 104, 106 are each held in a holding device 108, 110.

Figure 4A:
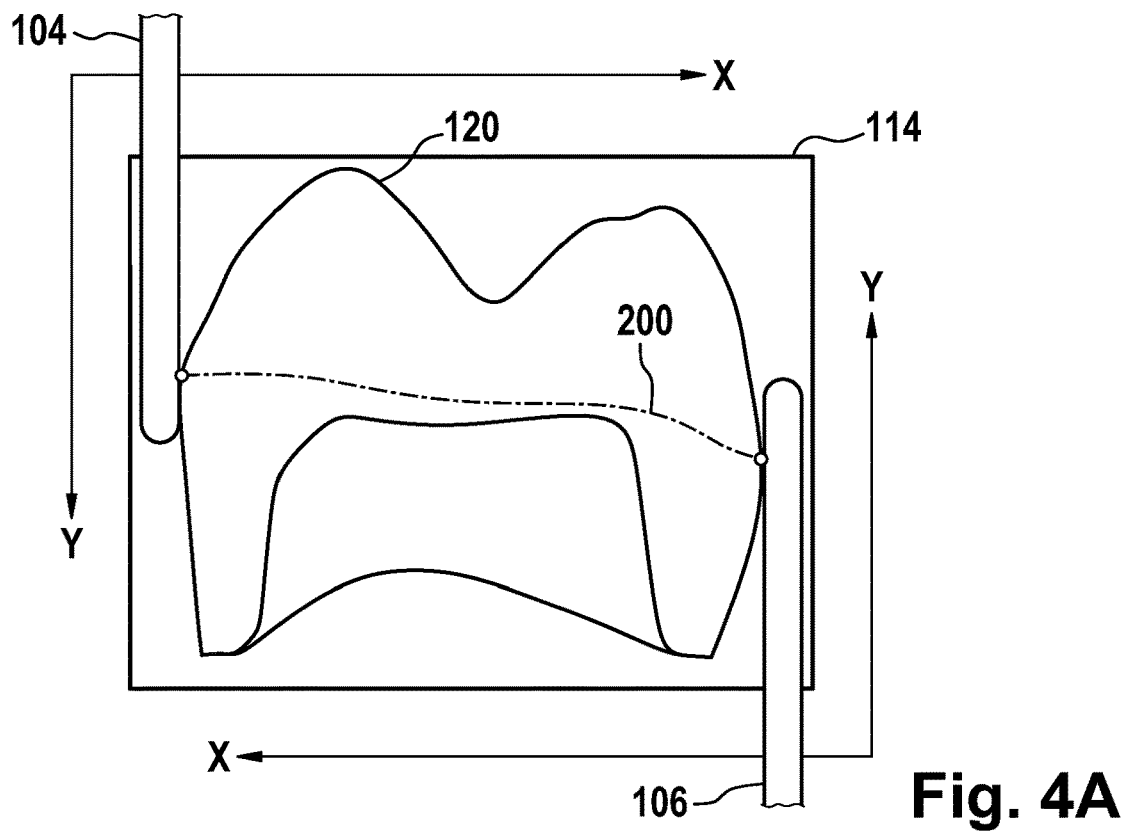
FIG. 4 show exemplary orientations of a blank body.
Figure 4B:
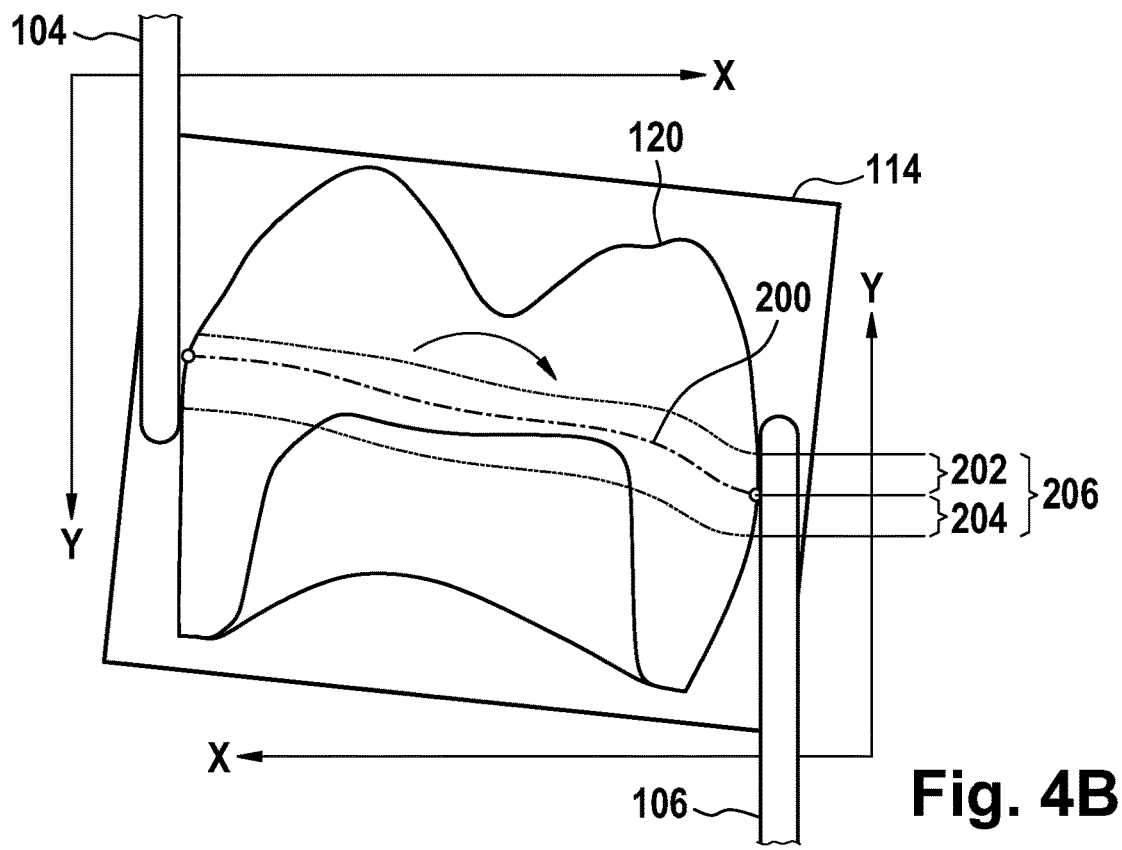
Figure 5:
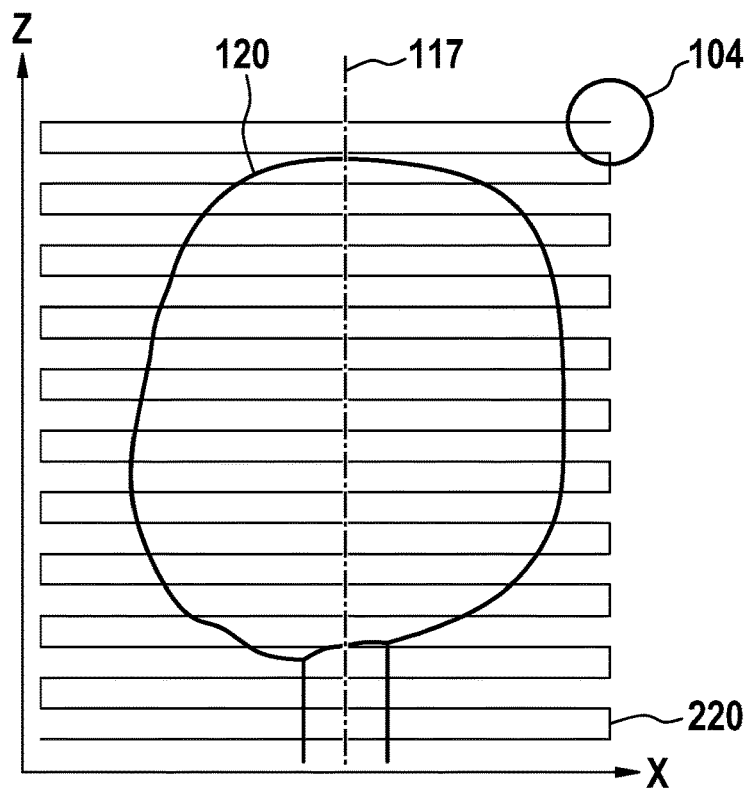
FIG. 5 shows exemplary processing paths for producing the tooth replacement part.

FIGS. 4A and 4B show exemplary orientations of a blank body 114. A tooth replacement part 120 is to be machined from the blank body 114. The tooth replacement part 120 has an equator 200, which represents a maximum line of extent of the tooth replacement part 120 perpendicularly to the axis of rotation of the processing tools 104, 106, i.e. perpendicularly to the spatial axis Z, in a reference orientation of the processing tools 104, 106 and the blank body 114. As may be seen with reference to FIG. 4A, the first processing tool 104, in the event of movements along the spatial axes X and Z, may reach only a region above the equator 200, whereas the second processing tool 106 may reach only regions of the tooth replacement part 120 below the equator 200. In FIG. 4B the blank body 114 has been pivoted about a pivot axis perpendicular to the drawing plane. It has thus been made possible for the first processing tool 104 to reach the region 204 below the equator 200, whereas it has been made possible for the second processing tool 106 to reach the region 202 above the equator 200. The two regions 202 and 204 together form an overlap region 206, which may be processed by both processing tools 104, 106 on account of pivoting of the blank body 114 about the pivot axis. As appropriate, the pivoting may be performed in the inverse direction of rotation about the pivot axis. The corresponding overlap region 26 may be found on both sides of the tooth material to be machined, or extends along the equator 200 in the form of a band around the tooth replacement part. The overlap region may vary in its width along the periphery of the tooth replacement part since teeth generally are not mirror-symmetrical. The width of the overlap region for example lies in the region of several millimetres. FIG. 5 shows exemplary processing paths 220 for producing the tooth replacement part 120. The pivot axis about which the orientation of the processing tools 104, 106 relative to the blank body 114 may be varied is likewise shown as an exemplary pivot axis 117. This extends parallel to the spatial axis Y. Perpendicularly thereto, the processing tool 104 extending perpendicularly to the drawing plane is guided over parallel processing paths 220, so as to thus machine the tooth replacement part 120 from the blank body 114. Variations of the relative orientation between the blank body 114 and processing tool 104 occur over the corresponding processing paths 220, and therefore different angles of contact of the processing tool 104 with the tooth replacement part 120 to be machined may be provided in some sections.

Figure 6:
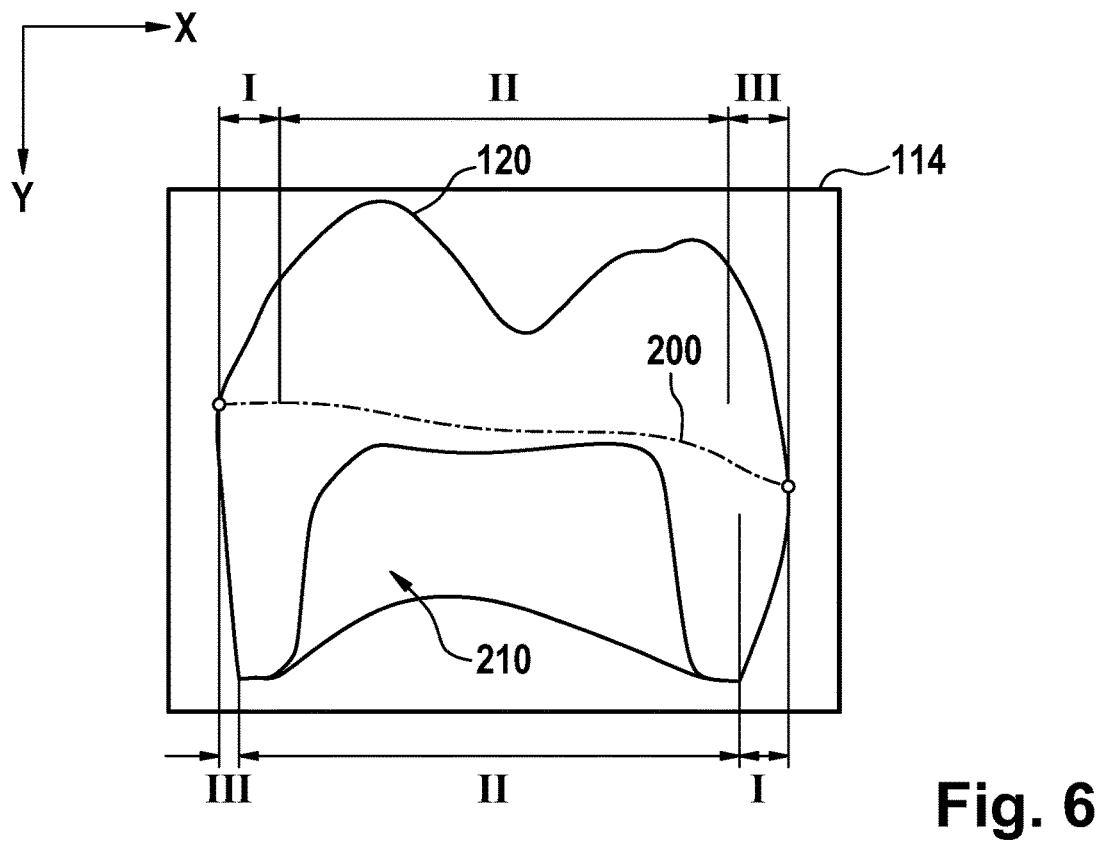
FIG. 6 shows a schematic division of exemplary path sections.

FIG. 6 shows a schematic division of exemplary path sections I to III for the first processing tool 104 and the second processing tool 106. The first and the second processing tool 104, 106 each pass through these three path sections over a processing path along the spatial axis X. The orientation of the blank body 112 relative to the two parallel processing tools 104, 106 varies within the path sections I and III. The angle of contact of the corresponding processing tools 104, 106 is thus varied in the path sections I and III. The start and end regions of the processing paths 220 that together form the overlap section are located in the path sections I and III respectively. These overlap sections are processed in each case by both processing tools 104, 106. A corresponding division of the two-path sections thus makes it possible for the processing at the start of a processing path, i.e. in the path section I, and at the end of a processing path, i.e. in the path section III, to be performed in each case with a variation of the angle of contact, whereby uniform transitions, i.e. with continuous curvatures, may be attained in the equator region. The length of the sections I, II and III may be the same or different for the two processing sides.

Figure 7A:
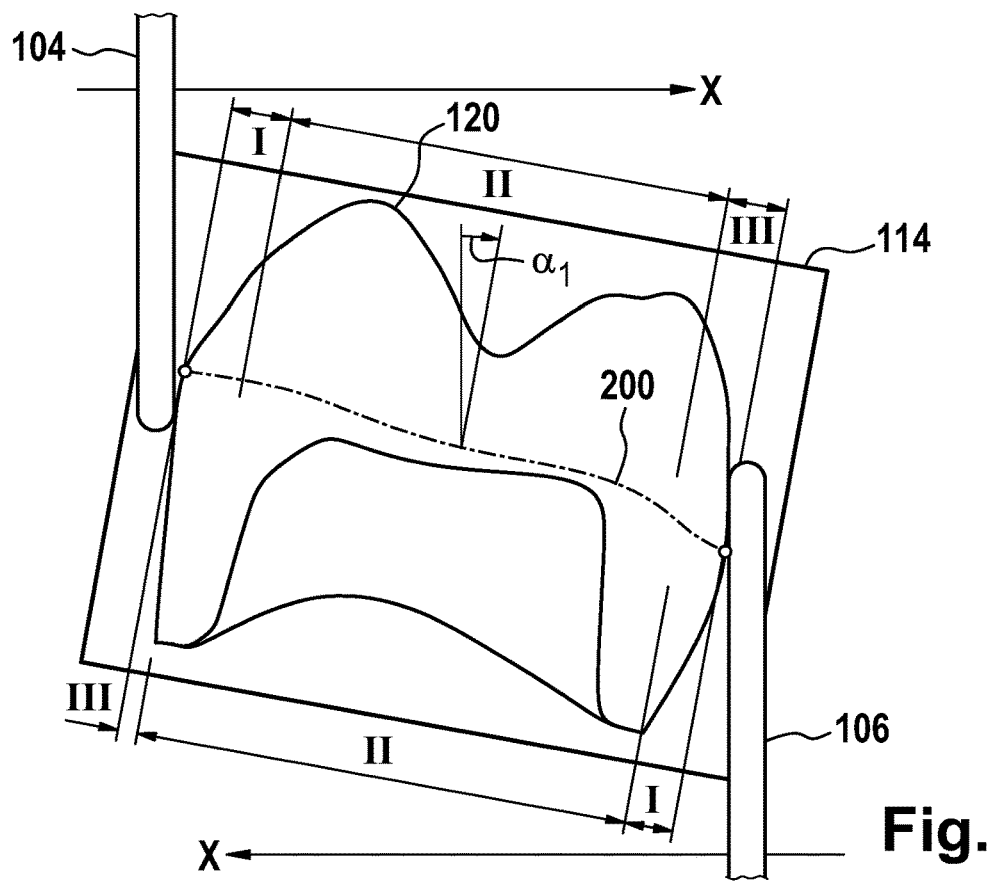
FIG. 7 show exemplary orientations of the blank body.
Figure 7B:
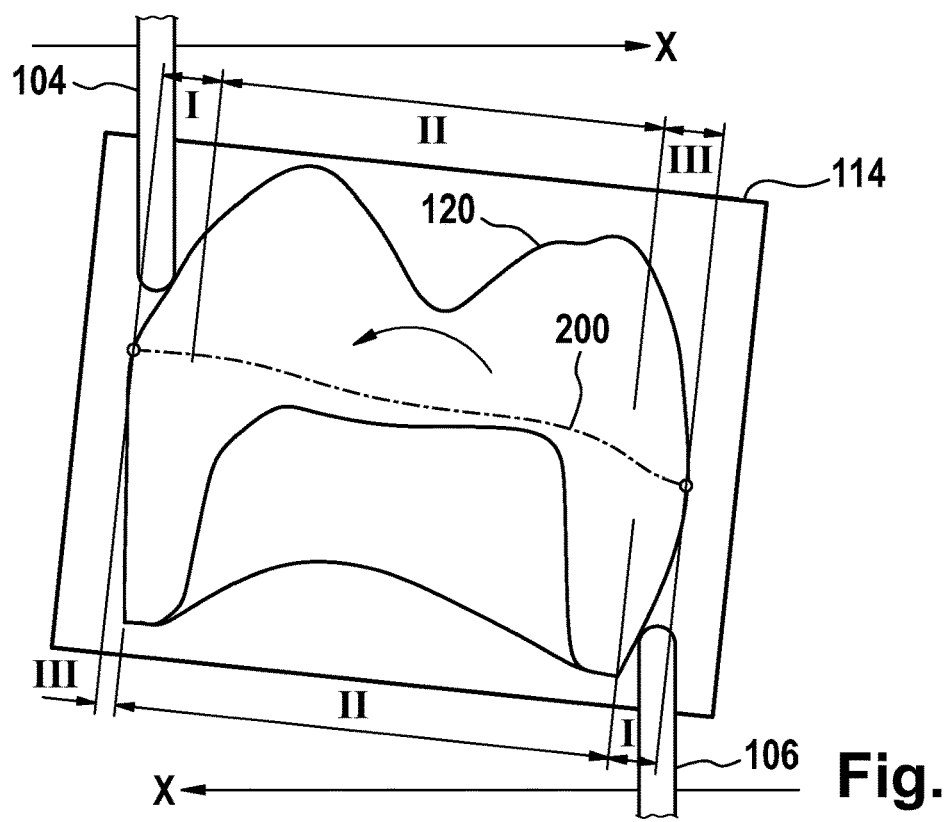

In FIG. 7A the blank body 114 is initially pivoted relative to the two processing tools 104, 106. To this end, the blank body 114 is for example pivoted about a pivot angle $\alpha_1$. This pivot angle is specified relative to a reference angle $\alpha_0$ of the reference orientation, for example $\alpha_0=0$. This enables the processing tool 104, 106 to process sections on the opposite side of the equator 200 within the first path section I. Whilst the processing tools 104, 106 are moved along the spatial direction X, the blank body 114, as shown in FIG. 7B, is pivoted from the pivoted orientation 100 in FIG. 7A into the reference orientation according to FIG. 4A. To this end, a pivoting in the inverse direction of the pivot angle $\alpha_1$ back into the reference angle $\alpha_0$ is performed. The angle of contact of the processing tools 104, 106 within the path section I thus varies depending on the position of the processing tools 104, 106 in the X direction. Uniform curvatures thus may be machined, in particular curvatures that change uniformly along the X direction, without an end face of the processing tools 104, 106 coming into contact with the blank body 114, or wherein corresponding instances of contact may be minimised. As the sections II are passed through, the reference angle $\alpha_0$ of the reference orientation is kept constant.

Figure 7C:
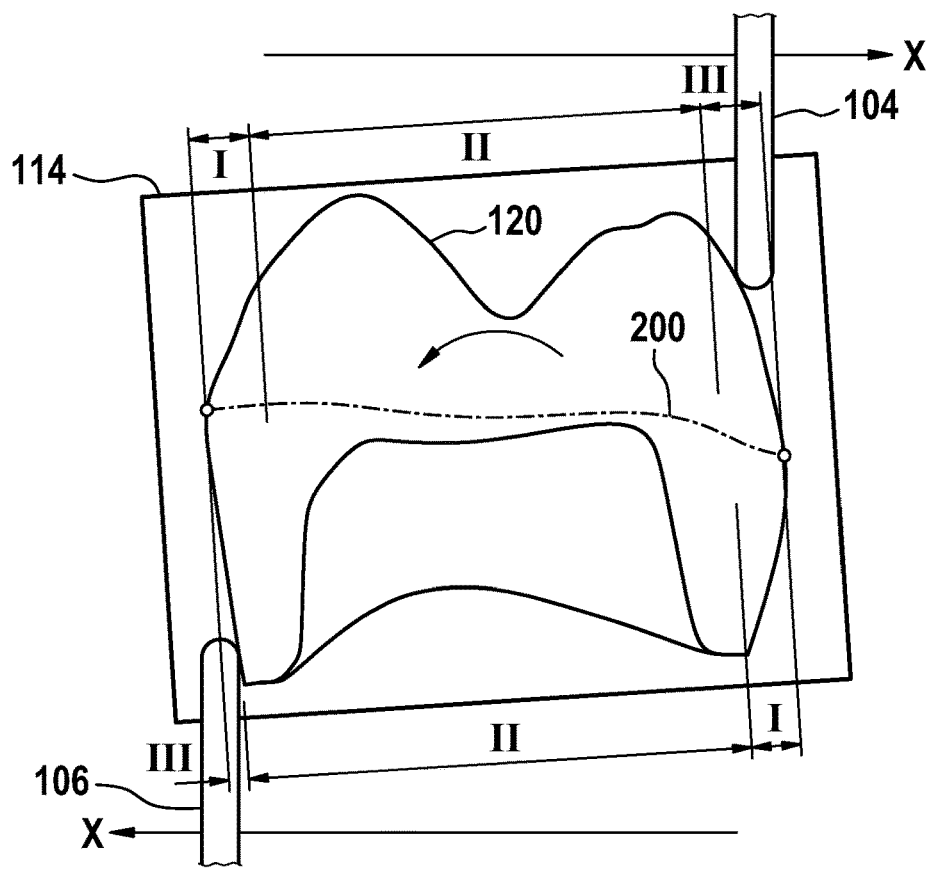
Figure 7D:
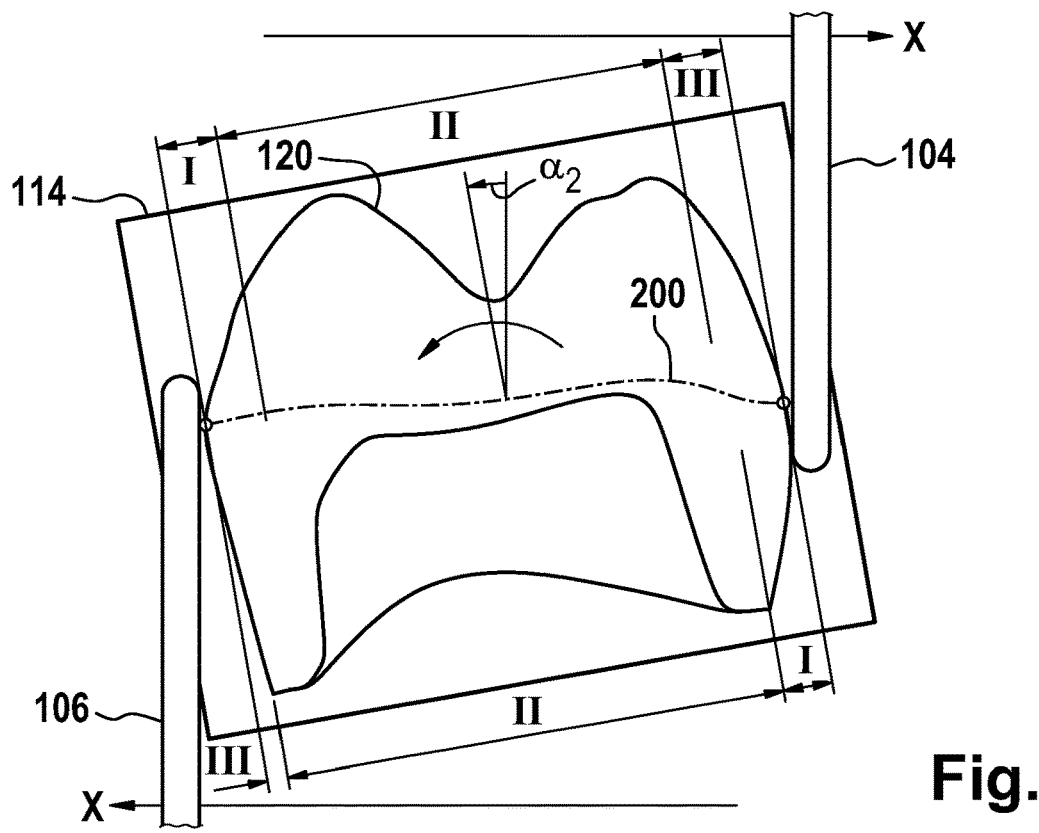

FIG. 7C shows the situation at the end of the corresponding processing paths in the sections III. Whilst the processing tools 104, 106 were passing through the path section II, the angle of contact in the processing tool 104, 106 was not varied, i.e. there was no pivoting. In the end region of the processing path, i.e. in the path section III, there is a pivoting from the reference orientation in a pivot direction inverse to the pivot angle $\alpha_1$. The maximum deflection about the pivot angle $\alpha_2$ is shown in FIG. 7D, which enables the processing tool 104, 106, in the path section III, to reach regions on opposite sides of the equator 200 of the tooth replacement part to be machined. These regions were processed previously already by the other processing tool 106, 104 during the course of the first path section I (see FIGS. 7A and 7B), resulting in an overlap region which was processed by both processing tools 104, 106.

Figure 8A:
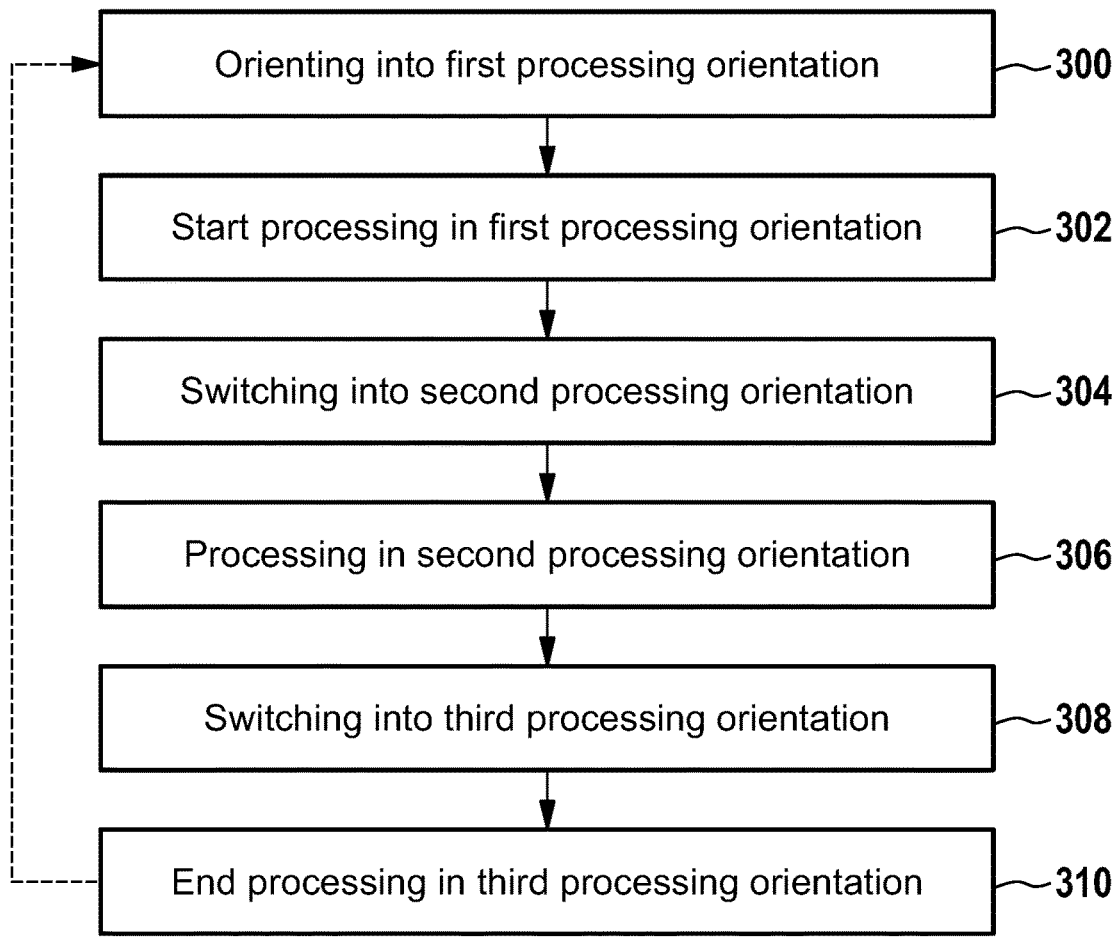
FIG. 8 show an exemplary method for producing a tooth replacement part.

FIG. 8A shows a flow diagram of an exemplary method for producing a tooth replacement part 120 as already illustrated in FIGS. 7A to 7D. In the block 300 the processing tools and the blank body are oriented relative to one another in a first processing orientation. To this end, for example, the blank body is pivoted from a relative reference orientation about a pivot angle, i.e. pivot angle $\alpha_1$. In block 302 the processing in the first processing orientation starts. In the block 304 the orientation of the blank body relative to the processing tools is switched into a second processing orientation, i.e., the blank body is oriented into the second processing orientation. The resulting second processing orientation is the reference orientation with the reference angle $\alpha_0$, for example $\alpha_0=0$. In other words, the blank body for example is pivoted back from a starting orientation about an angle inverse to the aforementioned pivot angle $\alpha_1$ and of identical size, such that the initial orientation in block 300 is cancelled. The corresponding orienting into the second processing orientation in block 304 occurs advantageously whilst the processing tools are in contact with the blank body, such that the processing angles are thus varied. In block 306 processing is performed in the second processing orientation with constant angle of contact of the processing tools with the blank body. In block 308 the orientation of the blank body relative to the processing tools is switched into a third processing orientation, i.e., the blank body is oriented into the third processing orientation. Here, the blank body is pivoted for example about a pivot angle $\alpha_2$ inverse to the initial pivot angle $\alpha_1$. In accordance with embodiments the pivot angles $\alpha_1$ and $\alpha_2$ may be of the same size. In accordance with alternative embodiments the pivot angles $\alpha_1$ and $\alpha_2$ may have different sizes. In block 310 the processing in the third processing orientation is ended. In accordance with embodiments the processing is ended when the orienting into the third processing orientation is completed. In accordance with embodiments the third processing orientation is reached at the end of the processing path. At the end of a processing path or when a processing path has been passed through in full, a next processing path is started with block 300, for example.

Figure 8B:
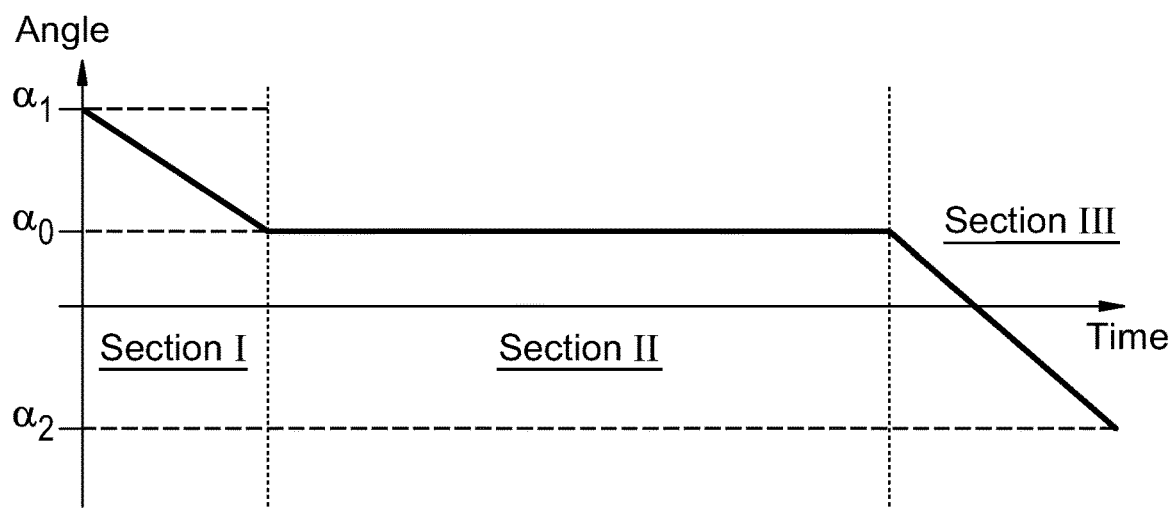

FIG. 8B shows the chronological angle sequence whilst the processing tools are passing through sections I, II and III along the X axis as shown in FIGS. 7A to 7D. Initially the relative orientation of blank body and processing tools is pivoted from the reference angle $\alpha_0$ about the angle $\alpha_1$. The processing thus starts at the start of section I with a maximum employment of the processing tools in the form of the angle $\alpha_1$, which is transferred simultaneously within the section I into the reference angle $\alpha_0$. For example $\alpha_0=0°$. The section II is passed through with the reference angle $\alpha_0$ as static angle, i.e. the angle $\alpha_0$ is constant over the entire section II. When the section III is reached, the reference angle $\alpha_0$ is transferred simultaneously at the end of the processing path into the angle $\alpha_2$ of the section III. To this end, there is a pivoting in a pivot direction III opposite the pivot direction of the section I. In accordance with embodiments the two angles $\alpha_1$ and $\alpha_2$ are identical. In accordance with further embodiments the two angles $\alpha_1$ and $\alpha_2$ are different. The angles of contact or pivot angles $\alpha_1$ and $\alpha_2$ lie for example in the range of 5° to 10°.

FIG. 9 show exemplary orientations of the blank body 114 when machining a recess in the tooth replacement part. To this end, in addition to the variations of the orientation shown in FIGS. 7A to 7D, there are further variations whilst the recesses are being machined. For example, the path section II for the second processing tool 106 is divided into subordinate sections or sub-sections IIa, IIb and IIc. Whilst a first sub-section IIa is being passed through, there is a pivoting from the reference angle $\alpha_0$ about a pivot angle $\alpha_3$ and back. This pivoting is performed in an opposite direction as compared to the previous pivoting about the angle $\alpha_1$. During the course of this pivoting about the angle $\alpha_3$, an inner surface of the recess 210 is machined during a movement of the processing tool 106 in the spatial direction X. At the end of the corresponding inner surface and sub-section IIa, which for example may be a lateral inner surface of the recess 210, the reference orientation with the reference angle $\alpha_0$ is recovered. The path section IIb is passed through in the reference orientation, as shown in FIG. 9D. At the end of the path section IIb or at the start of the path section IIIc, the blank body 114 is pivoted from the reference orientation about a pivot angle $\alpha_4$ in the same direction as the initial pivot angle $\alpha_1$ and back. This situation is illustrated in FIG. 9G. As a result of this procedure, it is possible for the processing tool 106 not to act in a machining manner via its end face as the inner surfaces of the recess 210 are machined, as shown in FIGS. 9B and 9F.

By means of the previously described simultaneous engagement of the second processing tool 106 in the recess 210 or the lumen, the surface quality of steep inner walls may be improved and undercuts may be formed. Undercuts of this kind in the recess 210 may be used for example to create a cavity for cement or adhesive between the tooth replacement part 120 and a restoration on which the tooth replacement part is to be fastened. For example, an adhesive gap for adhesive and for compensation of any variations is provided between the tooth replacement part 120 and restoration. The tooth replacement part 120 should sit fully on the restoration, for example a tooth stump. In order to prevent secondary caries, the adhesive gap at the preparation line should be as small as possible, in particular zero. A gap for adhesive or cement may further be created in this case by means of an undercut in the recess 210 of the tooth replacement part 120.

For simultaneous engagement of the second processing tool 106 in the recess 210, the section II on the base side of the tooth replacement part, i.e. for the second processing tool 106, is divided into the previously described three sub-sections IIa, IIb and IIc.

Figure 9A:
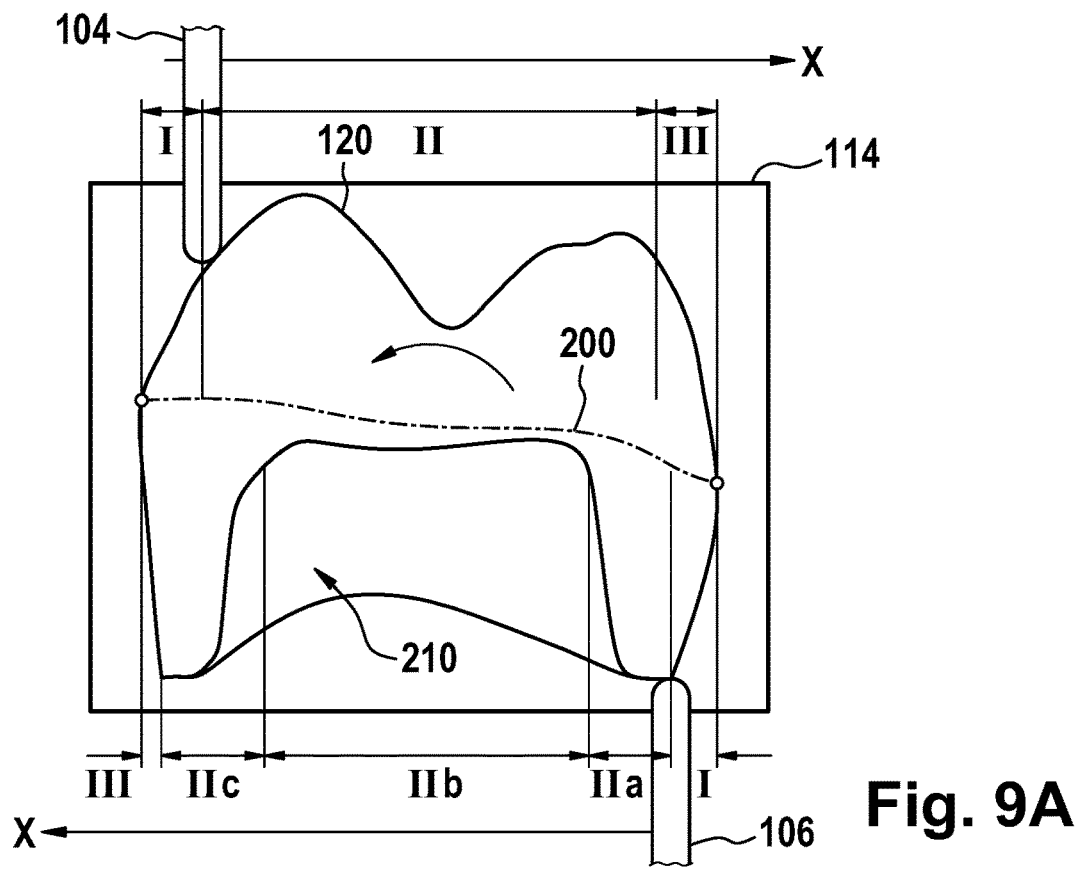
FIG. 9 show exemplary orientations of the blank body.
Figure 9B:
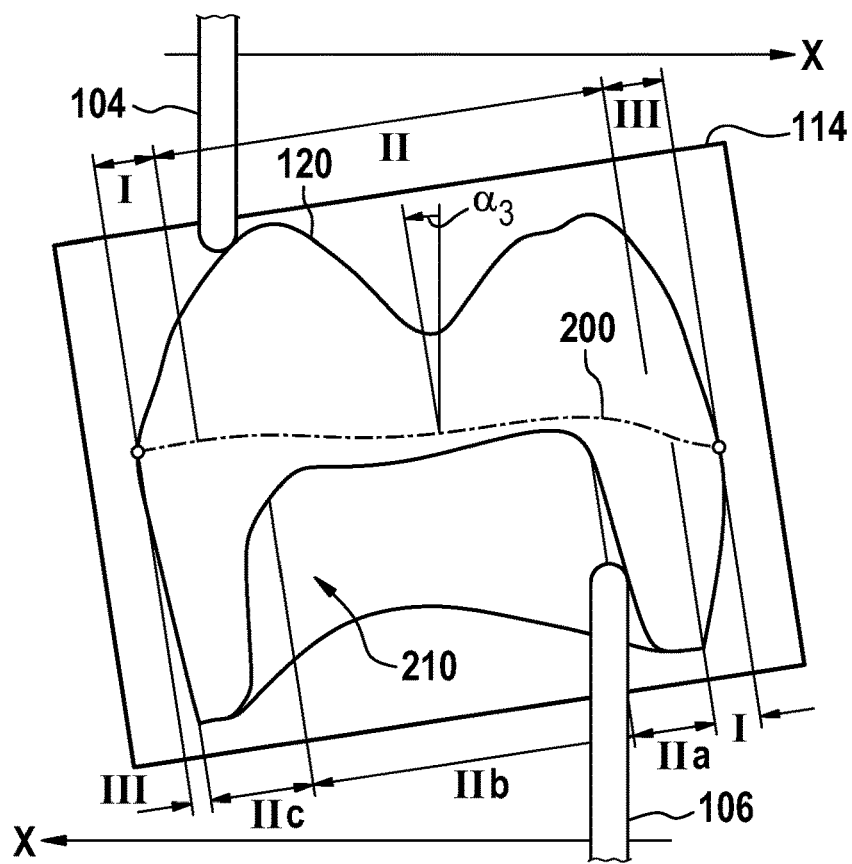
Figure 9C:
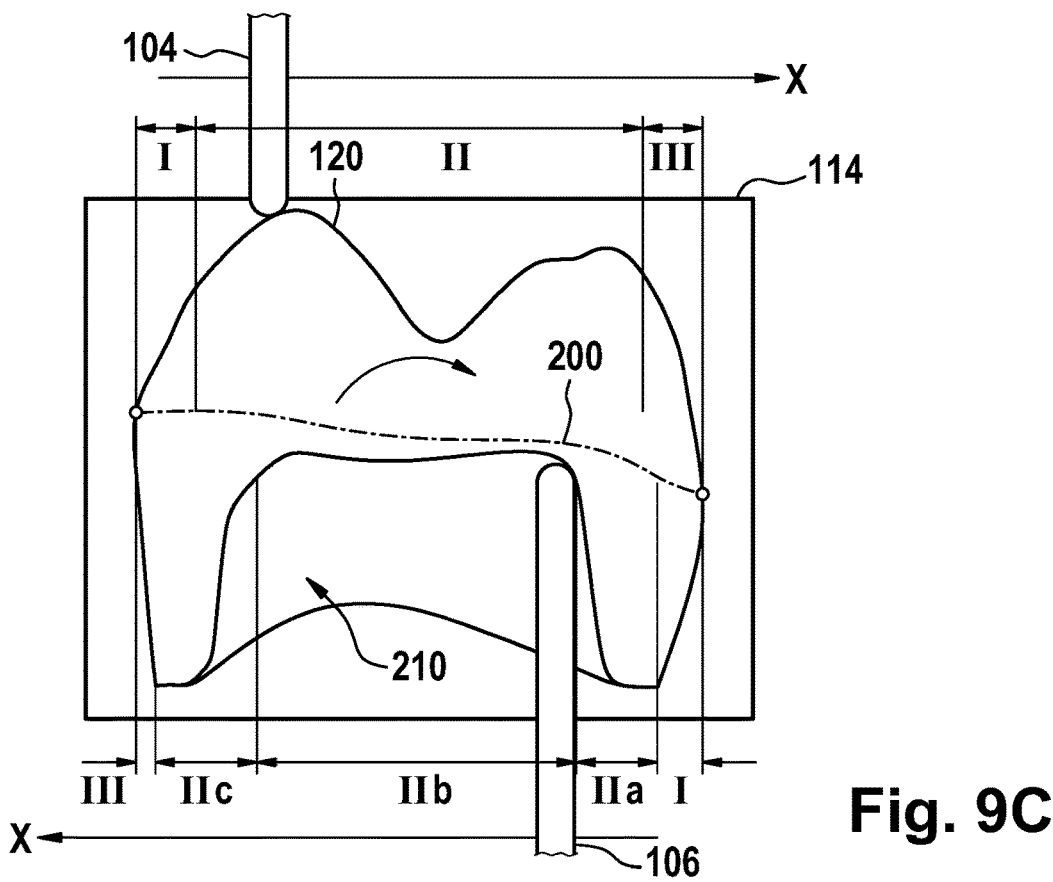
Figure 9D:
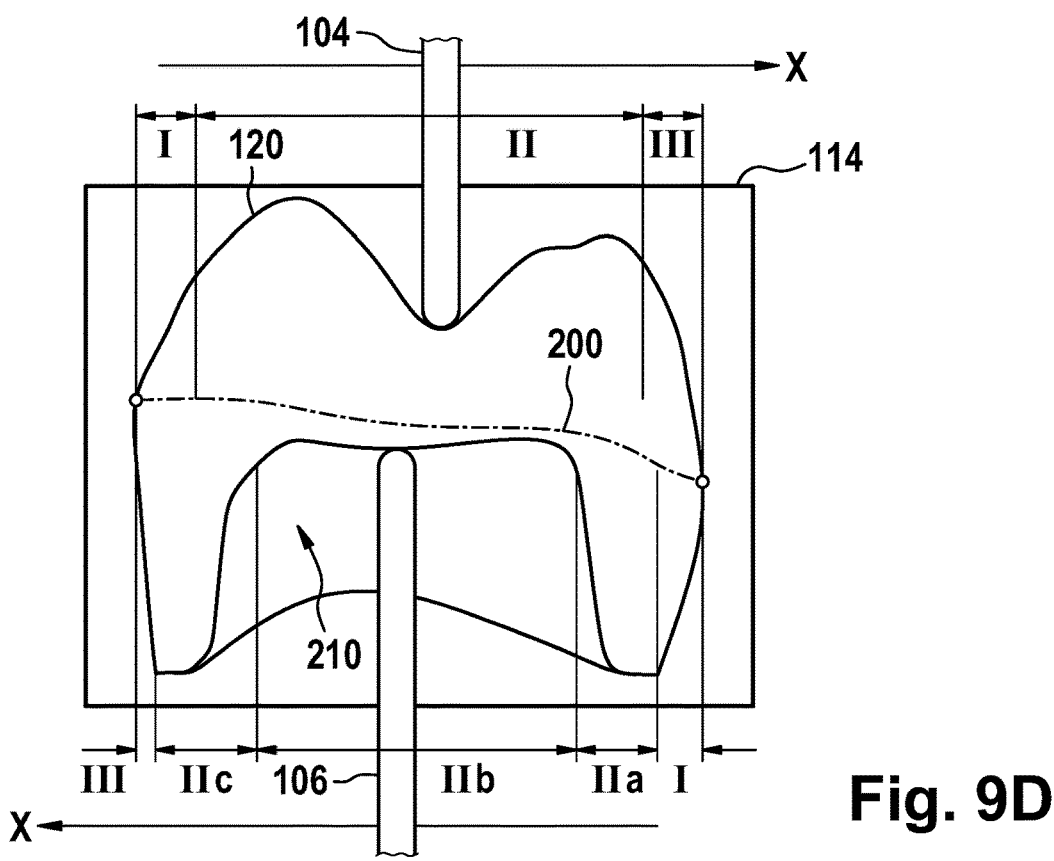
Figure 9E:
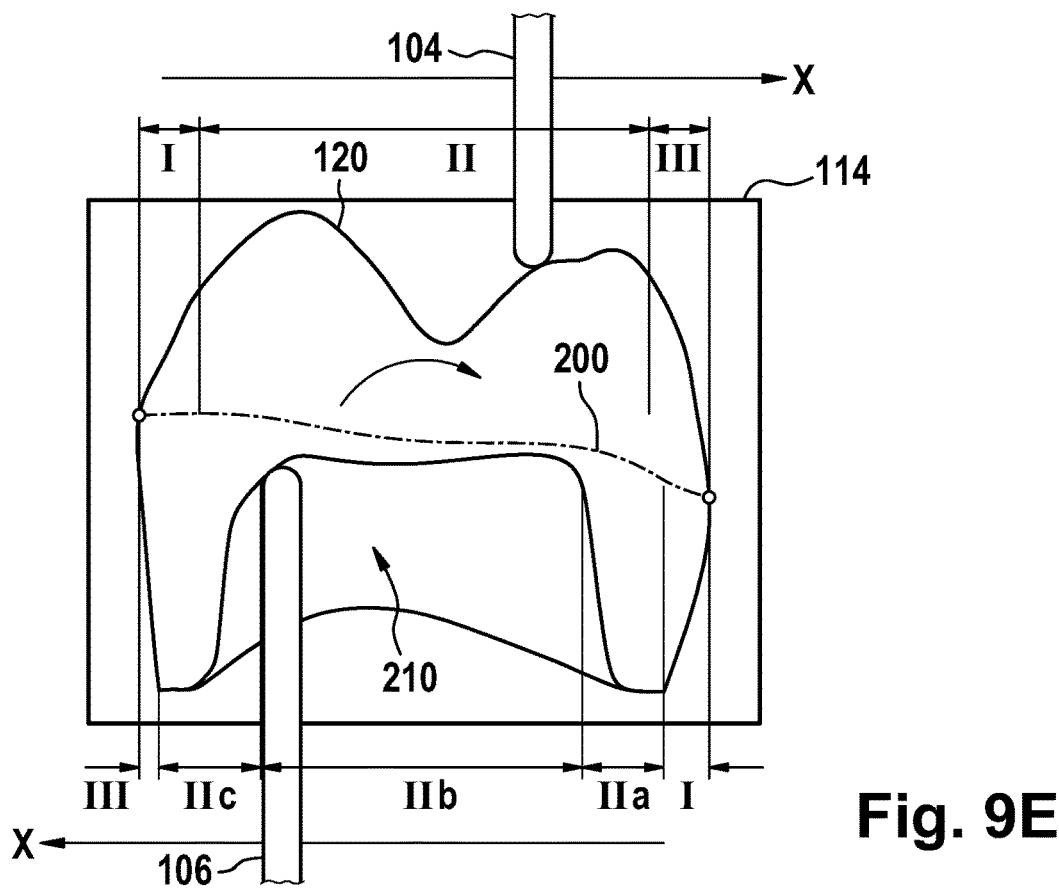
Figure 9F:
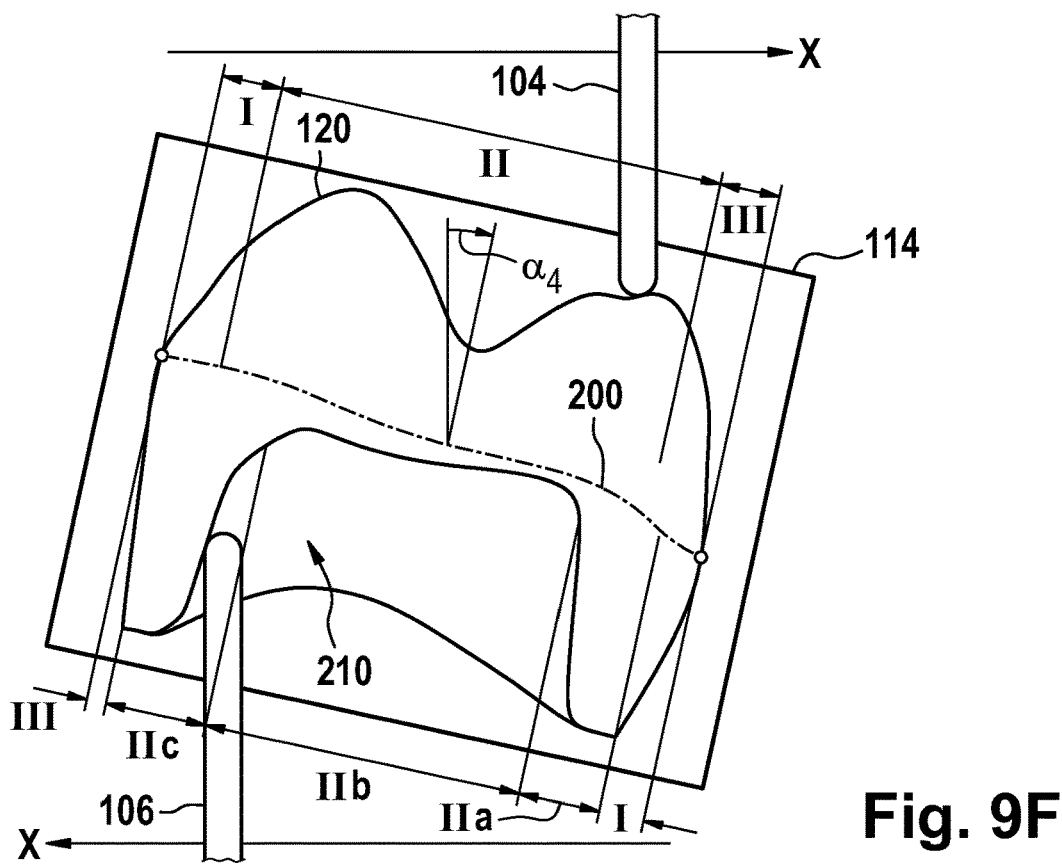
Figure 9G:
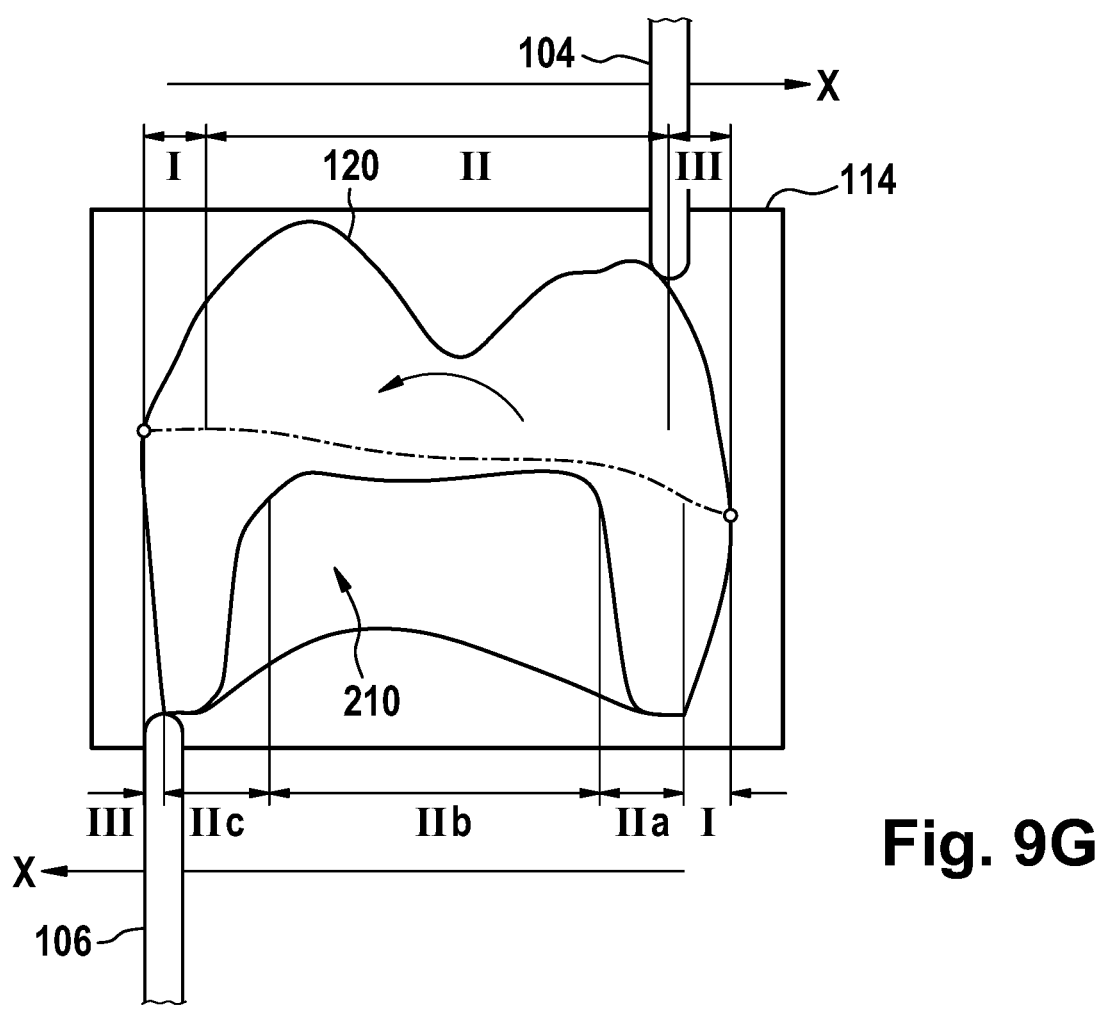
Figure 10A:
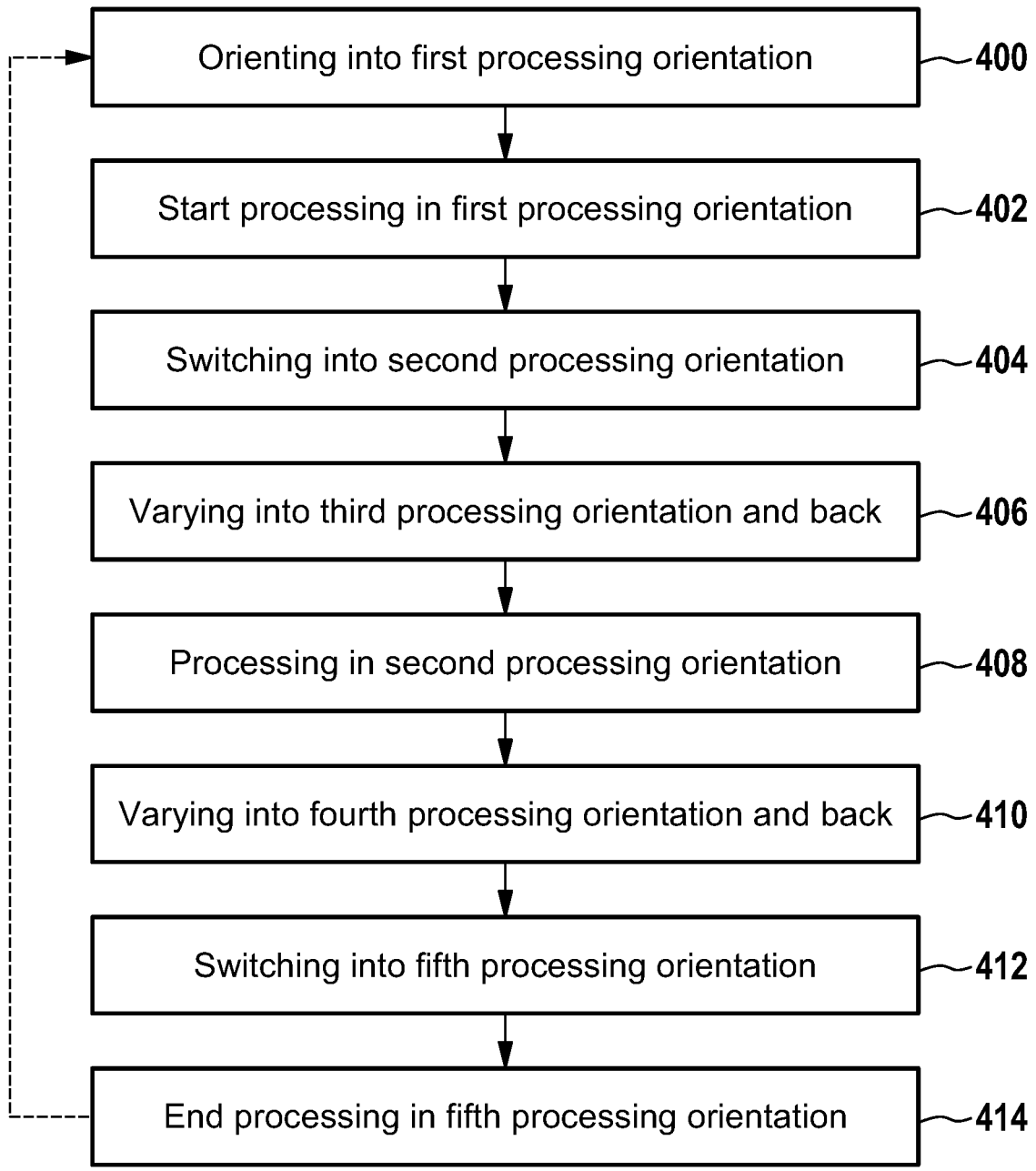
FIG. 10 show an exemplary method for producing a tooth replacement part.

FIG. 10A shows a flow diagram of an exemplary method for producing a tooth replacement part 120 according to FIGS. 9A to 9B. In block 400 there is an initial orienting of the blank body relative to the processing tools in a first processing orientation performed, in block 402 processing is performed in the first processing orientation, and in block 404 the orientation of the blank body relative to the processing tools is switched into a second processing orientation, i.e., the blank body is oriented into the second processing orientation. This corresponds to blocks 300 to 304 of FIG. 8A. In block 406 the orientation is varied from the second processing orientation into a third processing orientation and back into the second processing orientation. This corresponds to FIG. 9B. In block 408 processing is then performed in the second processing orientation, corresponding to block 306 in FIG. 8A. In block 410 the orientation is varied from the second processing orientation into a fourth processing orientation and back into the second processing orientation. This corresponds to FIG. 9F. In blocks 412 and 414 an orientation is then performed in a fifth processing orientation, and processing is ended. For this purpose, the orientation of the blank body relative to the processing tools is switched into the processing orientation, i.e., the blank body is oriented into the fifth processing orientation. If the fifth processing orientation is reached, the processing is then ended. The blocks 412 and 404 correspond to blocks 308 and 310 of FIG. 8A.

Figure 10B:
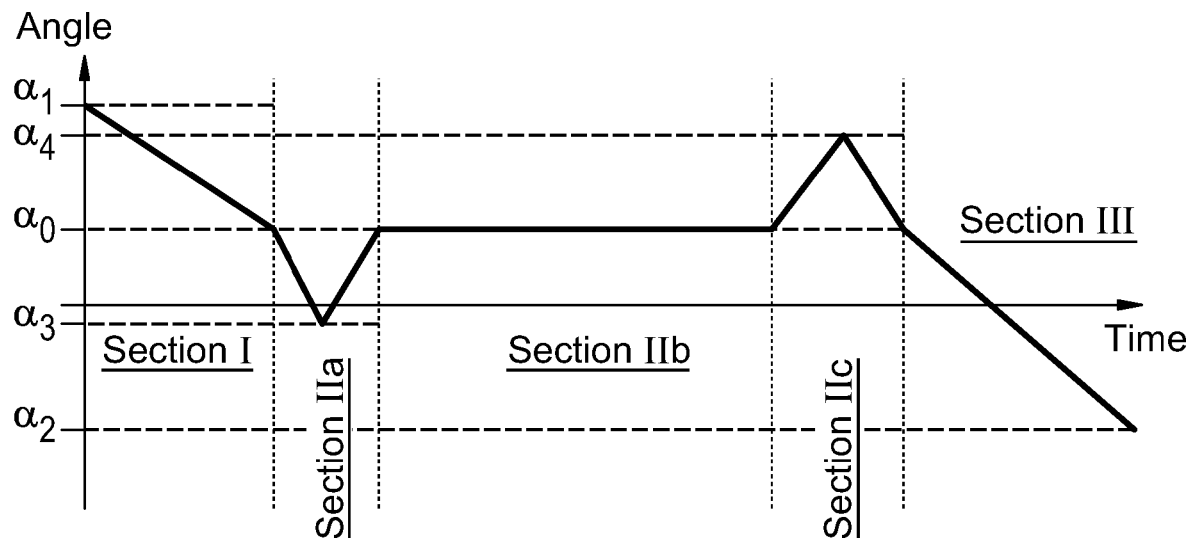

FIG. 10B shows the chronological angle sequences whilst the processing tools pass through sections I, IIa, IIb, IIc and III along the X axis as shown in FIGS. 9A to 7G. The angle variations according to FIG. 10B in sections I and III correspond to the angle variations shown in sections I and II in FIG. 8B. In the section IIa the angle of contact, starting with the reference angle $\alpha_0$, is pivoted to a maximum value $\alpha_3$ in a pivot direction opposite that in section I, simultaneously with a feed through the tooth restoration material in the X direction, and returns to the reference angle $\alpha_0$ at the end of the region IIa. As the section IIb is passed through, the reference angle $\alpha_0$ is kept constant over the entire region. When the section IIc is reached, the angle of contact therefore starts with the reference angle $\alpha_0$, is pivoted to a maximum value $\alpha_4$ in a pivot direction identical to that in section I, simultaneously with a feed through the tooth restoration material in the X direction, and returns to the reference angle $\alpha_0$ at the end of the region IIc. In accordance with embodiments the two angles $\alpha_3$ and $\alpha_4$ are identical. In accordance with further embodiments the two angles $\alpha_3$ and $\alpha_4$ are different. In accordance with embodiments the two angles $\alpha_3$ and $\alpha_4$ are identical to the angles $\alpha_1$ and $\alpha_2$. In accordance with further embodiments the two angles $\alpha_3$ and $\alpha_4$ are different from the angles $\alpha_1$ and $\alpha_2$.

Figure 11:
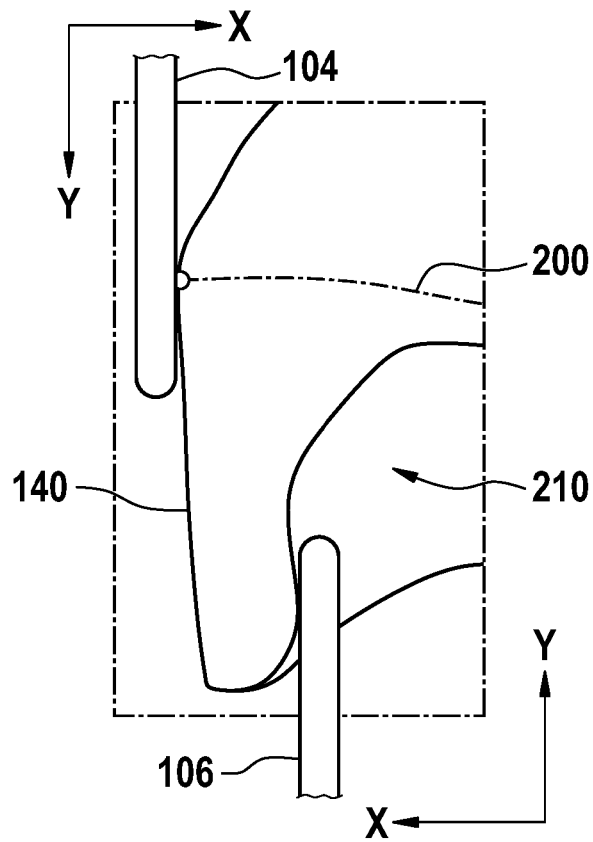
FIG. 11 shows exemplary undercuts.

FIG. 11 shows exemplary undercuts. As may be seen, on account of the surface geometry of the tooth replacement part 120, i.e. of the undercut of the outer surface resulting from the equator 200 and of the undercut in the inner surface of the recess 210, the processing tools 104, 106 by means of a triaxial movement, i.e. a movement along the orthogonal spatial axes X, Y and Z, cannot reach all surface regions of the tooth replacement part to be processed by the corresponding processing tool. In particular, a feed of the processing tools 104, 106 along the spatial axis Z in the shown relative orientation of the tooth replacement part 120 and the processing tools 104, 106 does not allow the corresponding processing tools to reach the surfaces of the undercuts.

FIG. 12 show exemplary trajectories of the processing paths of FIG. 5. The corresponding processing paths 220 may be parallel paths for example, which are oriented perpendicularly to the pivot axis 117 and are each arranged at the same distance A from one another. The paths for example have identical lengths L and run along a transverse direction of the blank. The path length corresponds for example to the width of the blank body in the transverse direction, in particular in the case of a cuboid or cube-shaped blank body. Conventional dimensions may be 8 mm to 16 mm, for example. The path distance A between adjacent processing paths 220 may be 0.1 mm, for example. This constitutes an average value for grinding processes, the value range of which in practice may further lie between 0.025 mm and 0.25 mm, in particular between 0.025 mm and 0.1 mm. In the present case the processing, for example the grinding, is performed along the actual processing paths, and the processing tools are fed with the corresponding path distance A between these processing paths 220. The angle between the adjacent processing paths in this parallel situation is 0°.

Figure 12A:
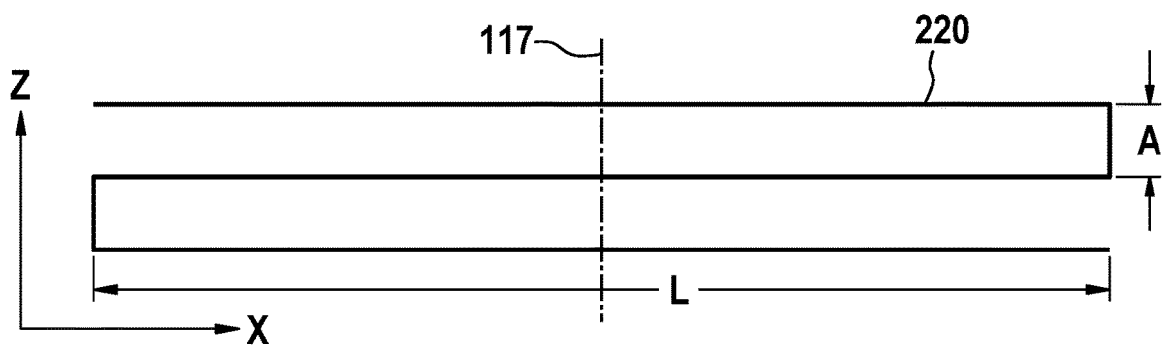
FIG. 12 show exemplary trajectories of the processing paths.
Figure 12B:
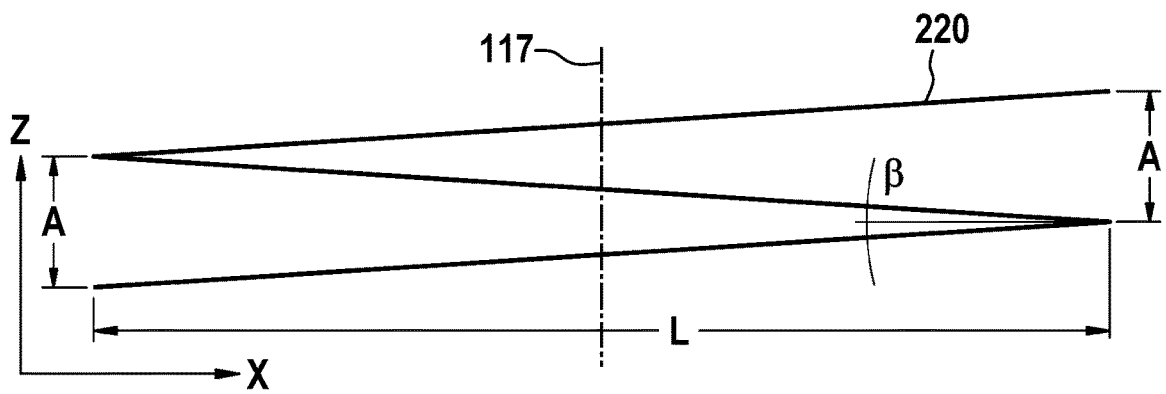

FIG. 12B shows an alternative embodiment in which the processing paths do not all run parallel to one another. For example paths following on from one another enclose an angle β. The path distance A is then a maximum distance between the start of the path and the end of a subsequent path or the maximum distance between the two corresponding paths. In accordance with embodiments, for example with consecutive numbering of the paths, the even paths may run parallel to one another and the odd paths may run parallel to one another, if all angles β are identical. In accordance with embodiments the angles between successive paths β may further vary slightly. In accordance with embodiments the corresponding paths 220 do not extend perpendicularly to the pivot axis 117. Consequently, the length L in this case is further not the path length, but rather the distance covered along a transverse direction of the blank body, wherein the individual processing paths each run inclined to this transverse direction. The length L corresponds here for example to the width of the blank body in the transverse direction. The angle β, for example with a path distance A of 0.1 mm and a length L of for example 8 mm, is β=0.4°. With a path distance of 0.25 mm, β=1°. A combination of the embodiments according to FIGS. 12A and 12B is also conceivable. Here, for example, the distance or the feed A of FIG. 12A is implemented partly by an angle β and partly by a perpendicular feed as in 12A.

Figure 12C:
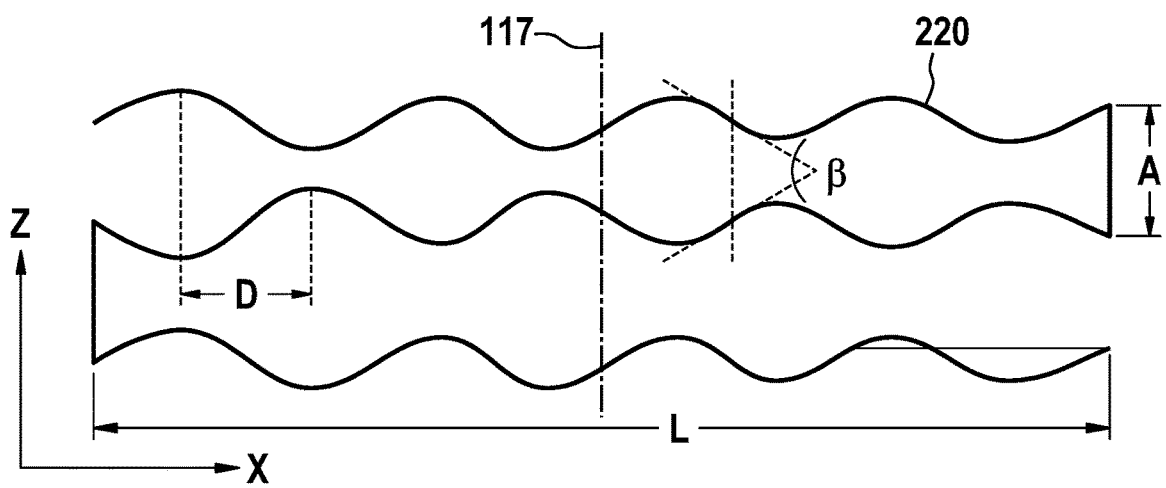

FIG. 12C lastly shows an embodiment in which the paths are not straight lines, but have a regular or irregular variation. Here, adjacent paths enclose a maximum angle β, for example locally, on account of the variation. The local maximum angle β may be limited upwardly for all paths 220. In accordance with embodiments the distance between maximum variations of successive paths may be identical or different. In accordance with embodiments the sequence of maximum deflections within a path may vary. The processing paths may thus further have arbitrary curvatures. Relative angles of the processing paths 220 are arranged here globally, i.e. between the start and end point of a processing path, in the same magnitude as in the case of FIGS. 12A and 12B. However, it is quite feasible for angles β in the range of up to 45° to be provided locally.

In accordance with embodiments the angle range for parallel operation is thus less than 1°, for global processing paths is for example less than 5°, and for local curvature for example may be less than 45°.

LIST OF REFERENCE SIGNS 100 processing system
102 CAM processing device
104 processing tool
106 processing tool
108 holding device
110 holding device
112 blank
114 blank body
116, 116' holder
117 pivot axis
118 holding device
119 screw
120 tooth replacement part
122 computer
124 keyboard
126 mouse
128 display device
130 graphical user interface
132 operating elements
134 CAD model
140 holding adapter
144 clamping device
146 clamping adapter
200 equator
202 overlap sub-region
204 overlap sub-region
206 overlap region
210 recess
220 processing paths
A path distance
L path length
D displacement
X first movement axis
Y third movement axis
Z second movement axis
$\alpha_0$ reference angle
$\alpha_1$ first pivot angle
$\alpha_2$ second pivot angle
$\alpha_3$ third pivot angle
$\alpha_4$ fourth pivot angle
β angle of inclination
I first section
II second section
IIa fourth section
IIb second section
IIc fifth section
III third section

The invention claimed is:

1. A method for producing a tooth replacement part from a blank using a CAM (Computer-aided manufacturing) processing device, the blank comprising a blank body made of tooth restoration material, wherein the CAM processing device comprises a holding device for positioning the blank in a processing position, the CAM processing device further comprising a first pin-shaped material-removing processing tool, which is rotatable about a first longitudinal tool axis, and a second pin-shaped material-removing processing tool, which is rotatable about a second longitudinal tool axis, for machining the tooth replacement part from the blank, wherein the two longitudinal tool axes are coupled to one another during the machining, such that both longitudinal tool axes are oriented parallel to one another, wherein the two processing tools, in the processing position, come into contact with the blank body from opposite sides at least temporarily simultaneously during the machining and, depending on the shape of the tooth replacement part to be machined, are moved along a first movement axis perpendicular to the two longitudinal tool axes and a second movement axis parallel to the two longitudinal tool axes, wherein the method comprises:

varying an orientation of the blank body in the processing position relative to the two processing tools, the varying comprising:

a first orienting of the blank body and processing tools relative to one another from a first processing orientation into a second processing orientation, the orientation of the blank body relative to the two processing tools in the first processing orientation in relation to the orientation of the blank body relative to the two processing tools in the second processing orientation is pivoted at a first pivot angle about a pivot axis, which is oriented perpendicularly to the two longitudinal tool axes, wherein the first orienting comprises a pivoting of the orientation of the blank body relative to the two processing tools from the first processing orientation into the second processing orientation simultaneously with a feed movement of at least one of the two processing tools through the tooth restoration material of the blank body during the machining.

2. The method according to claim 1, wherein the varying of the orientation of the blank body relative to the two processing tools comprises a pivoting of the blank body about the pivot axis by means of the holding device.

3. The method according to claim 1, wherein the varying of the orientation of the blank body relative to the two processing tools comprises a pivoting of the two processing tools about the pivot axes.

4. The method according to claim 1, wherein the varying of the orientation is at least performed in order to machine a first region of an outer surface of the tooth replacement part by means of the first processing tool, said first region comprising a first overlap region which is to be processed by both processing tools.

5. The method according to any one of claim 4, wherein an equator of the tooth replacement part runs through the first overlap region and, in the second processing orientation of the blank body, defines a maximum extent of the tooth replacement part perpendicularly to the two tool axes, and the first overlap region, as a result of the processing by both processing tools, has a continuous curvature at least along a direction perpendicular to the equator.

6. The method according to claim 5, wherein, simultaneously with the machining of the first region of the tooth replacement part comprising the first overlap region, a second region of the outer surface of the tooth replacement part is machined by the second processing tool and comprises a second overlap region which is to be processed by both processing tools, wherein the equator of the tooth replacement part runs through the second overlap region, and wherein the two regions are arranged on mutually opposed sides of the tooth replacement part.

7. The method according to claim 1, wherein the varying of the orientation further comprises a second orienting of the blank body and processing tools relative to one another in a third processing orientation, wherein the orientation of the blank body relative to the two processing tools in the third processing orientation is pivoted about the pivot axis through a second pivot angle in relation to the orientation of the blank body relative to the two processing tools in the second processing orientation, in a pivot direction inverse to the first pivot angle, wherein the second orienting is performed at least for secondary machining of the first overlap region, machined by the first processing tool, by means of the second processing tool.

8. The method according to claim 7, wherein the second orienting comprises a pivoting of the orientation of the blank body relative to the two processing tools from the second processing orientation into the third processing orientation simultaneously with the feed movement of at least one of the two processing tools through the tooth restoration material of the blank body during the machining.

9. The method according to claim 1, wherein the varying of the orientation is performed at least in order to machine an undercut in a surface of the tooth replacement part.

10. The method according to claim 9, wherein the surface in which the undercut is machined is an inner surface in a recess in the tooth replacement part, and wherein, if the blank body and the two processing tools are oriented relative to one another in the second processing orientation, the undercut to be machined comprises a region of the recess, the extent of which perpendicularly to the first movement axis increases as considered in a direction along the first movement axis into the recess.

11. The method according to claim 1, wherein the two processing tools are each moved through the tooth restoration material along the two processing axes successively over a plurality of processing paths in parallel movement planes perpendicularly to the two tool axes, wherein the varying of the orientation of the blank body relative to the two processing tools is performed individually for each of the processing paths of the plurality of processing paths.

12. The method according to claim 11, wherein the individual processing paths are each divided into path sections, wherein the plurality of processing paths each comprise at least one first path section, wherein, as said path section is passed through, the orientation of the blank body relative to the two processing tools is pivoted from the first processing orientation into the second processing orientation, and at least one second path section, wherein, as said second path section is passed through, the blank body and the two processing tools are oriented relative to one another in the second processing orientation.

13. The method according to claim 12, wherein the plurality of processing paths each comprise a third path section, wherein, as said third path section is passed through, the orientation of the blank body relative to the two processing tools is pivoted from the second processing orientation into the third processing orientation.

14. The method according to claim 12, wherein the processing paths for at least one of the two processing tools each comprise a fourth and fifth path section, wherein, when the fourth path section is passed through, the orientation of the blank body relative to the two processing tools is pivoted from the second processing orientation into a fourth processing orientation, and from the fourth processing orientation back into the second processing orientation, wherein, when the fifth path section is passed through, the orientation of the blank body relative to the two processing tools is pivoted from the second processing orientation into a fifth processing orientation, and from the fifth processing orientation back into the second processing orientation, wherein the orientation of the blank body relative to the two processing tools in the fourth processing orientation is pivoted about the pivot axis through a third pivot angle in relation to the orientation of the blank body relative to the two processing tools in the second processing orientation, wherein the orientation of the blank body relative to the two processing tools in the fifth processing orientation is pivoted about the pivot axis through a fourth pivot angle in relation to the orientation of the blank body relative to the two processing tools in the second processing orientation, in a pivot direction inverse to the third pivot angle, wherein the first and second overlap region of the outer surface of the tooth replacement part are processed within the first and third path section, and wherein undercuts are formed in the recess of the tooth replacement part within the fourth and fifth path section.

15. The method according to claim 1, wherein the two processing tools are moved in a mirror-inverted manner along the first movement axis.

16. The method according to claim 1, wherein the tooth restoration material comprises a ceramic or sintered tooth restoration material, and
wherein the blank body, prior to machining, comprises a cube-shaped blank body having dimensions between 8 mm and 40 mm.

17. The method according to claim 1, wherein the tooth restoration material comprises a ceramic or sintered tooth restoration material, and
wherein the blank body, prior to machining, comprises a cylindrical shape having a diameter less than or equal to 105 mm and a height between 12 mm and 22 mm.

18. The method according to claim 1, wherein the shape of the tooth replacement part, after machining, is asymmetrical with respect to the second longitudinal axis.

19. A system comprising:
a processor;
a CAM processing device for producing a tooth replacement part from a blank, the blank comprising a blank body made of tooth restoration material, the CAM processing device comprising: a holding device for positioning the blank in a processing position, the CAM processing device further comprising a first pin-shaped material-removing processing tool, which is rotatable about a first longitudinal tool axis, and a second pin-shaped material-removing processing tool, which is rotatable about a second longitudinal tool axis, for machining the tooth replacement part from the blank, wherein the two longitudinal tool axes are coupled to one another during the machining, such that both longitudinal tool axes are oriented parallel to one another,
wherein the processor is configured to:
bring the two processing tools, in the processing position, into contact with the blank body from opposite sides at least temporarily simultaneously during the machining and, depending on the shape of the tooth replacement part to be machined, are moved along a first movement axis perpendicular to the two longitudinal tool axes and a second movement axis parallel to the two longitudinal tool axes, and
vary an orientation of the blank body in the processing position relative to the two processing tools, by:
a first orienting of the blank body and processing tools relative to one another from a first processing orientation into a second processing orientation, the orientation of the blank body relative to the two processing tools in the first processing orientation in relation to the orientation of the blank body relative to the two processing tools in the second processing orientation is pivoted at a first pivot angle about a pivot axis, which is oriented perpendicularly to the two longitudinal tool axes,
wherein the first orienting comprises a pivoting of the orientation of the blank body relative to the two processing tools from the first processing orientation into the second processing orientation simultaneously with a feed movement of at least one of the two processing tools through the tooth restoration material of the blank body during the machining.

20. A non-transitory computer readable storage medium storing computer-readable instruction that cause a processor of a computer system, comprising a CAM processing device, which includes a holding device for positioning the blank in a processing position, the CAM processing device further comprising a first pin-shaped material-removing processing tool, which is rotatable about a first longitudinal tool axis, and a second pin-shaped material-removing processing tool, which is rotatable about a second longitudinal tool axis, for machining the tooth replacement part from the blank, wherein the two longitudinal tool axes are coupled to one another during the machining, such that both longitudinal tool axes are oriented parallel to one another, to:
bring the two processing tools, in the processing position, into contact with a blank body of a blank from opposite sides at least temporarily simultaneously during the machining and, depending on the shape of the tooth replacement part to be machined, are moved along a first movement axis perpendicular to the two longitudinal tool axes and a second movement axis parallel to the two longitudinal tool axes, and
vary an orientation of the blank body in the processing position relative to the two processing tools, by:
a first orienting of the blank body and processing tools relative to one another from a first processing orientation into a second processing orientation, the orientation of the blank body relative to the two processing tools in the first processing orientation in relation to the orientation of the blank body relative to the two processing tools in the second processing orientation is pivoted at a first pivot angle about a pivot axis, which is oriented perpendicularly to the two longitudinal tool axes,
wherein the first orienting comprises a pivoting of the orientation of the blank body relative to the two processing tools from the first processing orientation into the second processing orientation simultaneously with a feed movement of at least one of the two processing tools through a tooth restoration material of the blank body during the machining.

* * * * *

UNITED STATES PATENT AND TRADEMARK OFFICE
CERTIFICATE OF CORRECTION

| | | |
|---|---|---|
| PATENT NO. | : 12,453,621 B2 | Page 1 of 1 |
| APPLICATION NO. | : 17/439189 | |
| DATED | : October 28, 2025 | |
| INVENTOR(S) | : Oliver Noworra | |

It is certified that error appears in the above-identified patent and that said Letters Patent is hereby corrected as shown below:

On the Title Page

In Item (71), in "Applicant", in Column 1, Line 1, delete "inc.," and insert --Inc.,-- therefor In the Claims In Column 21, Line 20, in Claim 5, after "to", delete "any one of"

In Column 23, Line 15, in Claim 19, after "comprising:", insert a linebreak

Signed and Sealed this
Twenty-third Day of December, 2025

John A. Squires
*Director of the United States Patent and Trademark Office*